(12) United States Patent
Kile

(10) Patent No.: US 11,641,806 B1
(45) Date of Patent: May 9, 2023

(54) THRESHING BARS AND COMBINE HARVESTER THRESHER FORMED THEREWITH

(71) Applicant: Ronald J. Kile, Rosalia, WA (US)

(72) Inventor: Ronald J. Kile, Rosalia, WA (US)

( * ) Notice: Subject to any disclaimer, the term of this patent is extended or adjusted under 35 U.S.C. 154(b) by 255 days.

(21) Appl. No.: 17/065,292

(22) Filed: Oct. 7, 2020

(51) Int. Cl.
*A01F 12/22* (2006.01)
*A01F 7/04* (2006.01)
*A01F 12/26* (2006.01)
*A01F 12/18* (2006.01)

(52) U.S. Cl.
CPC .............. *A01F 12/22* (2013.01); *A01F 7/04* (2013.01); *A01F 12/185* (2013.01); *A01F 12/26* (2013.01)

(58) Field of Classification Search
CPC .......... A01F 12/22; A01F 7/04; A01F 12/185; A01F 12/26
See application file for complete search history.

(56) References Cited

U.S. PATENT DOCUMENTS

| | | | | |
|---|---|---|---|---|
| 1,853,784 A * | 4/1932 | Stevens | ................... | A01F 12/20 460/71 |
| 4,889,517 A * | 12/1989 | Strong | .................... | A01F 12/22 460/71 |
| 4,946,419 A * | 8/1990 | Cromheecke | ............. | A01F 7/06 460/71 |
| 5,035,675 A * | 7/1991 | Dunn | ...................... | A01F 12/22 56/2 |
| 6,325,714 B1 * | 12/2001 | Tanis | ...................... | A01F 12/22 460/71 |
| 8,087,982 B1 * | 1/2012 | Kile | ........................ | A01F 12/20 460/71 |
| 9,807,939 B1 * | 11/2017 | Kile | ........................ | A01F 12/20 |
| 10,321,633 B1 * | 6/2019 | Kile | ........................ | A01F 12/22 |
| 2007/0026913 A1 * | 2/2007 | Kuchar | .................. | A01F 12/22 460/112 |
| 2012/0214560 A1 * | 8/2012 | Murray | .................. | A01F 12/22 460/71 |
| 2013/0012277 A1 * | 1/2013 | Kile | ........................ | A01F 12/20 460/71 |
| 2014/0024421 A1 * | 1/2014 | Flickinger | ............... | A01F 12/22 460/71 |

FOREIGN PATENT DOCUMENTS

| EP | 3153009 A1 * | 4/2017 | ............ A01D 41/02 |
|---|---|---|---|
| WO | WO-0111941 A1 * | 2/2001 | ............ A01F 12/20 |
| WO | WO-2020127548 A1 * | 6/2020 | ........... A01F 12/181 |

* cited by examiner

*Primary Examiner* — Arpad F Kovacs
(74) *Attorney, Agent, or Firm* — Parsons & Goltry, PLLC; Michael W. Goltry; Robert A. Parsons

(57) ABSTRACT

A combine harvester threshing drum threshing bar includes a threshing fixture including a leading edge, an opposed trailing end, a top threshing side, including a trailing threshing face that extends between the trailing end and the corner and a leading threshing that inclines downwardly from the corner to the leading edge to form a wedge in the threshing fixture, an opposed bottom threshing drum emplacement side, a first bore and a second bore. The first bore includes a first hole open to trailing threshing face that enlarges a second hole open to the threshing drum emplacement side. The second bore includes a third hole open to leading threshing face that enlarges a second hole open to the threshing drum emplacement side.

4 Claims, 28 Drawing Sheets

US 11,641,806 B1

THRESHING BARS AND COMBINE HARVESTER THRESHER FORMED THEREWITH

FIELD OF THE INVENTION

The present invention relates to combine harvesters.

More particularly, the present invention relates to threshing drums of combine harvesters.

In a further and more specific aspect, the present invention relates to threshing implements of threshing drums of combine harvesters.

BACKGROUND OF THE INVENTION

Agriculture is a major industry in the U.S., which is a net exporter of food. As of 2019 there were approximately two million farms in the U.S. covering an area of approximately 900 million acres. Although in 1800 approximately ninety percent of the entire U.S. population was employed in agriculture, present day numbers have dropped dramatically to approximately under two percent due largely to the development and implementation of large, automated agricultural equipment, such as combine harvesters, which have replaced huge numbers of farm workers.

The crops grown in the U.S., such as wheat, barley, and rye, are only partly edible. While the seeds or grains at the top of each plant are edible and useful for making products such as bread and cereal, the rest of the plant, the chaff, is inedible and is discarded. Before modern-day machines were developed, such as in the 1800's, agricultural workers harvested crops by carrying out a series of laborious operations one after another. First, they had to cut down the plants with a long-handled cutting tool such as a scythe. Next, they had to separate the edible grain from the inedible chaff by beating the cut stalks in an operation known as threshing. Finally, they had to clean any remaining debris away from the seeds to make them suitable for use in a mill. All this took a considerable amount of time and labor requiring large numbers of farm workers. The modern combine harvester carries out these various operations automatically eliminating the need for numerous farm workers.

As it is driven through a field of a growing crop, the combine harvester cuts, threshes, and separates the grain from the chaff by rotating blades, wheels, sieves, and elevators. The grain collects in a tank inside the combine harvester, which is periodically emptied into tractors that drive alongside, while the chaff is ejected onto the field from an ejection spout/opening at the back of the combine harvester.

A combine harvester generally includes a header configured with a pickup reel and a cutter, a threshing drum, sieves, a collection tank, and conveyors, including rotating belts and spinning augers. The header gathers the crop. The pickup reel pushes the crop toward the cutter, which cuts the crop at the base near ground level. Once cut, the plants travel on a conveyor open to the combine harvester. Inside the combine harvester, the rotating threshing drum threshes the plants to free the grains from the chaff to form threshings, namely, the chaff and the separated grains. A conveyance transports the threshings along the thresher from an upstream location of thresher to a downstream location of thresher while the thresher rotates. At the same time, the separated grains fall through sieves into a collection tank inside the combine harvester, which is periodically emptied into trucks or tractor-towed carts or trailers that drive alongside. At the same time, blowers blow the chaff outwardly onto the field through the ejection spout at the rear of the combine harvester. Some combine harvesters have a rotating spreader mechanisms or choppers that reduce and throw the chaff over a wide area, while others have bailers that bail the chaff for later use, such as for animal bedding.

Existing combine harvester threshers are complicated and difficult and expensive to maintain. Because some crops require aggressive threshing and others require less aggressive threshing, a thresher must be carefully configured to correspond to the given crop. For farmers that grow various crops, this often required that the farm maintain numerous combine harvesters at a substantial cost with threshers configured for different crops. Since maintaining numerous combine harvesters is impracticable for most farmers, modern threshers are designed to be reconfigured as needed from one crop to the next.

A modern thresher consists of a threshing drum having cylindrical outer surface or exterior configured with attached threshing bars. The threshing drum is mounted for rotation relative to a thresher concave in a threshing direction or threshing direction of rotation. The attached threshing bars are chosen to thresh a given crop applied between the cylindrical exterior of the threshing drum and the thresher concave in response to rotation of threshing drum in the threshing direction. The threshing bars thresh the crop cuttings between the cylindrical exterior and the thresher concave separating the grains from the chaff to form threshings when the threshing drum rotates in the threshing direction. The separated grains fall through sieves into the collection tank inside the combine harvester.

The threshing bars and the threshing drum are configured to enable the threshing bars to be releasably connected to the cylindrical exterior of the threshing drum. Since threshing bars are available in a variety of configurations, this enables the farmer to selectively configure and reconfigure the threshing drum with chosen threshing bars suitable to thresh any given crop.

Threshing bars of modern threshers must carefully positioned on, and secured to, the threshing drum to enable them to efficiently thresh a crop and favorably influence grain loss. However, current attachment methods of often result in the bars shifting position and even detaching during use, which inherently unfavorably influences crop threshing and grain loss. Given at least these and other deficiencies, the need for improvement in the art is evident.

SUMMARY OF THE INVENTION

According to the principle of the invention, a combine harvester threshing drum threshing bar includes a threshing fixture including a leading edge, a trailing end, a first face, a second face, a top threshing side and a bottom threshing drum emplacement side. The top threshing side includes a trailing threshing face, a leading threshing face and a corner. The corner is between the leading edge and the trailing end and extends between the first face and the second face. The trailing threshing face extends between the opposed first and second faces and between the trailing end and the corner. The leading threshing face extends between the opposed first and second faces and between the corner and the leading edge. The leading threshing face inclines downwardly relative to the trailing threshing face from the corner and cooperates with the bottom threshing drum emplacement side and the opposed first and second faces of the threshing fixture at the leading edge to form a wedge in the threshing fixture. A first bore extends through the fixture from the trailing threshing face to the threshing drum emplacement side and a second bore extends through the fixture from the leading threshing face to the threshing drum emplacement side. The first bore is between the opposed first and second faces and between the trailing end and the corner and includes a first hole open to the trailing threshing face that enlarges a second hole open to the threshing drum emplacement side. The second bore is between the opposed first and second faces and between the corner and the leading edge and includes a third hole open to the leading threshing face that enlarges a fourth hole open to the threshing drum emplacement side. A crop-threshing rasp structure formed in the top threshing side. The crop-threshing rasp structure is present along at least one of the trailing threshing face and the leading threshing face and includes alternating grooves and vanes.

According to the principle of the invention, a combine harvester thresher includes a combine harvester threshing drum mounted for rotation in a threshing direction relative to a combine harvester concave. The threshing drum has a cylindrical exterior. A population of threshing drum threshing bars is secured to the cylindrical exterior of the threshing drum for threshing a crop applied between the cylindrical exterior of the threshing drum and the concave in response to rotation of the threshing drum in the threshing direction. Each threshing drum threshing bar is a threshing fixture that includes a leading edge directed into the threshing direction, a trailing end directed away from the threshing direction, a first face, a second face, a top threshing side configured to thresh a crop applied between the cylindrical exterior of the threshing drum and the concave in response to rotation of the threshing drum in the threshing direction, a bottom threshing drum emplacement side in juxtaposition with the cylindrical exterior of the threshing drum, a first bore and a second bore. The top threshing side includes a trailing threshing face, a leading threshing face and a corner. The corner is between the leading edge and the trailing end and extends between the first face and the second face. The trailing threshing face extends between the opposed first and second faces and between the trailing end and the corner. The leading threshing face extends between the opposed first and second faces and between the corner and the leading edge. The leading threshing face inclines downwardly relative to the trailing threshing face from the corner and cooperates with the bottom threshing drum emplacement side and the opposed first and second faces of the threshing fixture at the leading edge to form a wedge in the threshing fixture. The first bore extends through the fixture from the trailing threshing face to the threshing drum emplacement side. The first bore is between the opposed first and second faces and between the trailing end and the corner and includes a first hole open to the trailing threshing face that enlarges a second hole open to the threshing drum emplacement side. The second bore extends through the fixture from the leading threshing face to the threshing drum emplacement side. The second bore is between the opposed first and second faces and between the corner and the leading edge and includes a third hole open to the leading threshing face that enlarges a fourth hole open to the threshing drum emplacement side. The fixture is secured to the threshing drum by a first bolt and a second bolt. The first bolt includes a shank that extends through the second hole from a head seated in the first hole and away from the threshing drum emplacement side to a connecting end secured to the threshing drum. The second bolt includes a shank that extends through the fourth hole from a head seated in the third hole and away from the threshing drum emplacement side to a connecting end secured to the threshing drum. A crop-threshing rasp structure formed in the top threshing side. The crop-threshing rasp structure is present along at least one of the trailing threshing face and the leading threshing face. The crop-threshing rasp structure comprises alternating grooves and vanes.

Consistent with the foregoing summary of preferred embodiments, and the ensuing detailed description, which are to be taken together, the invention also contemplates associated apparatus and method embodiments.

BRIEF DESCRIPTION OF THE DRAWINGS

Referring to the drawings.

DETAILED DESCRIPTION

Figure 1:
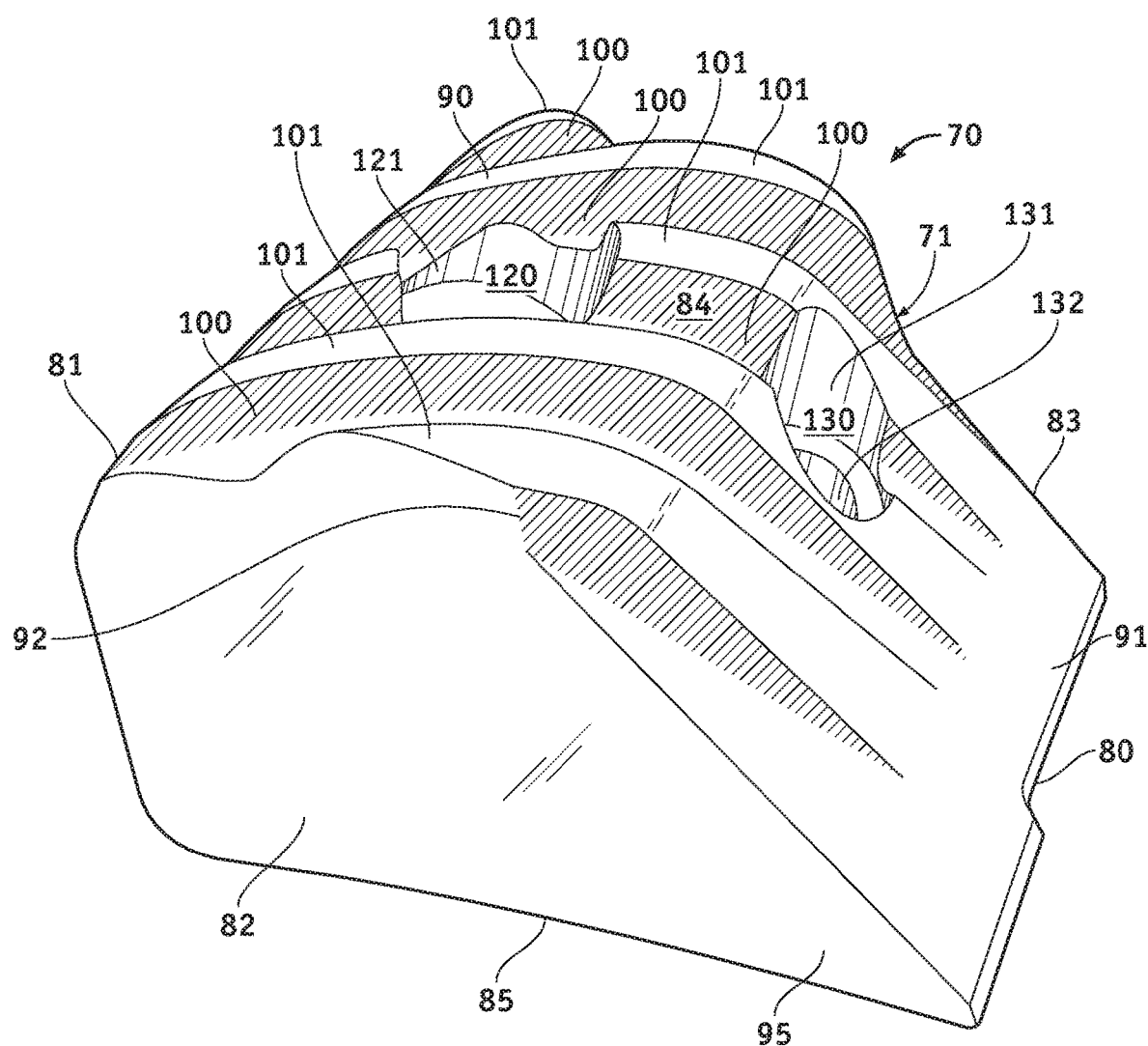
FIG. 1 is a front perspective view of a threshing bar constructed and arranged according to the invention.

In general, a combine harvester includes a header, configured with a pickup reel and a cutter, a thresher including a threshing drum having a cylindrical exterior configured with threshing bars, a concave under the thresher, sieves, a collection tank, and an array of conveyors, including rotating belts and spinning augers and fans. As the combine harvester is driven through a crop to be harvested, the header gathers and cuts the crop. Specifically, the pickup reel pushes the crop to the cutter, which cuts the crop at the base near ground level to form crop cuttings or, simply, cuttings. A conveyor picks up and transports the cuttings from the cutter to the thresher. The thresher rotates and the threshing bars thresh the cuttings along the thresher concave separating the grains from the chaff to form threshings, namely, the chaff and the separated grains. The grains fall through the sieves into the collection tank inside the combine harvester, which is periodically emptied, such as into tractors that drive alongside, while one or more blowers blow the chaff outwardly onto the field through an ejection spout at the rear of the combine harvester. Disclosed herein are improved threshing bars useful with a threshing drum and which are configured to be secured to the cylindrical exterior of the threshing drum in a way that disables them from shifting/displacing out of position without disabling their working threshing surfaces.

A

Turning now to the drawings, in which like reference characters indicate corresponding elements throughout the several views, FIGS. 1-8 illustrate threshing bar 70 constructed and arranged according to the invention. Looking briefly to FIGS. 9 and 10, thresher 50 includes threshing drum 60 having cylindrical outer surface or exterior 61 configured with a population of attached threshing bars 70. Threshing drum 60 is mounted for rotation relative to thresher concave 51 in a threshing direction or threshing direction of rotation generally indicated by arrow A. Arrow A indicates the direction of rotation of threshing drum 60, which is the same direction of travel of threshing bars 70 applied to threshing drum 60. Threshing bars 70 carried by threshing drum 60 are configured to thresh a crop applied between cylindrical exterior 61 of threshing drum 60 and thresher concave 51 in response to rotation of threshing drum 60 in the threshing direction indicated by arrow A. Threshing bars 70 thresh the crop cuttings between cylindrical exterior 61 and thresher concave 51 separating the grains from the chaff to form threshings when threshing drum 60 rotates in the threshing direction. The separated grains fall through sieves into the collection tank inside the combine harvester, which, again, is periodically emptied, such as into tractors that drive alongside, while the chaff is blow outwardly onto the field through an ejection spout/opening at the back/rear of the combine harvester by one or more fans or blowers inside the combine harvester.

Figure 2:
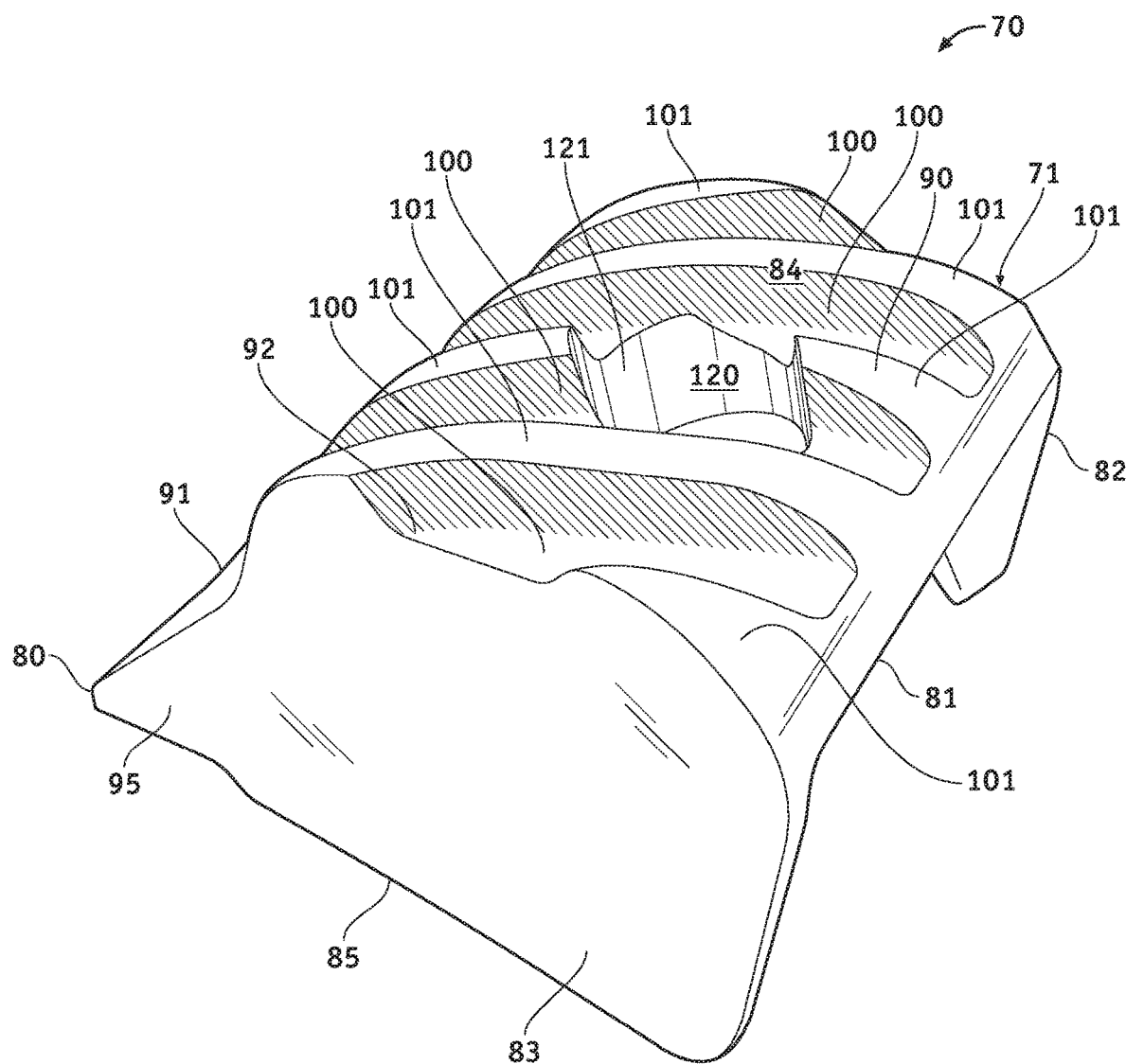
FIG. 2 is a rear perspective view of the embodiment of FIG. 1.
Figure 3:
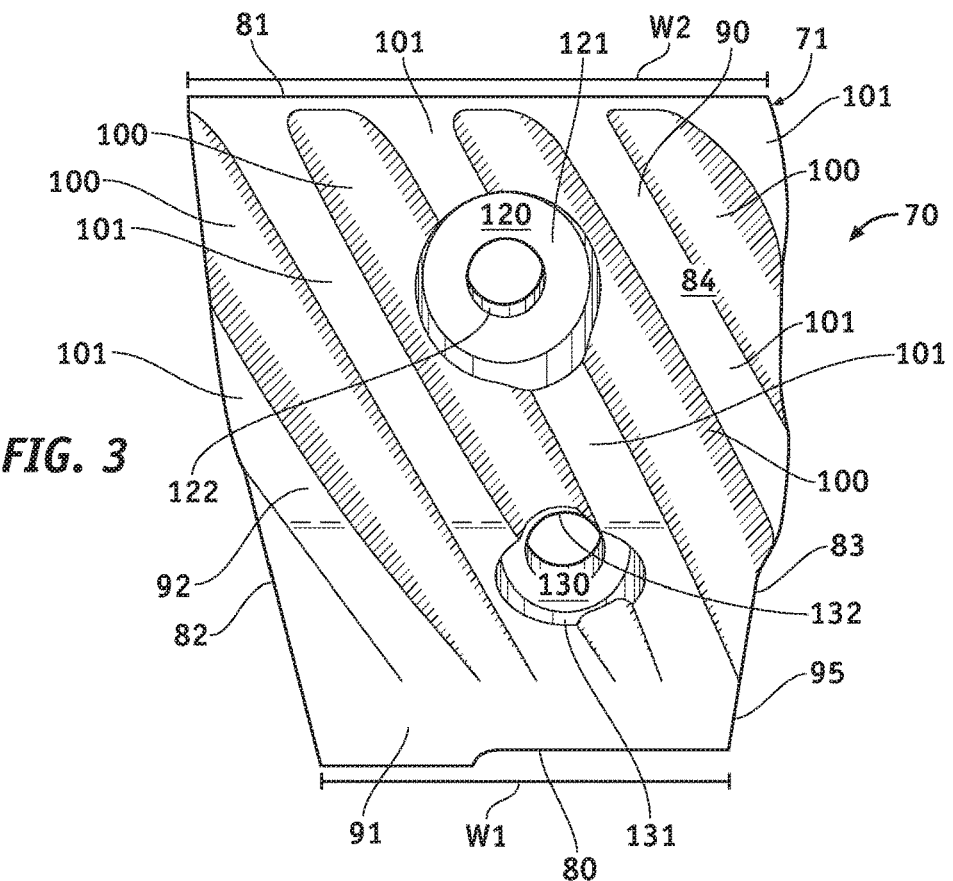
FIG. 3 is a top plan view of the embodiment of FIG. 1.
Figure 4:
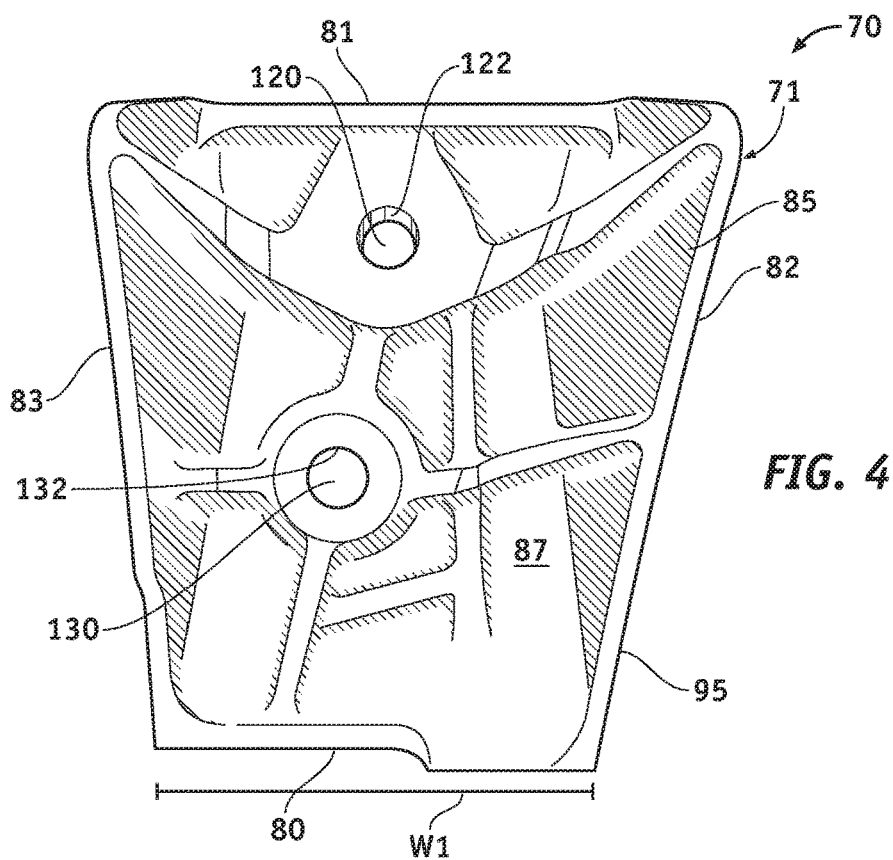
FIG. 4 is a bottom plan view of the embodiment of FIG. 1.
Figure 5:
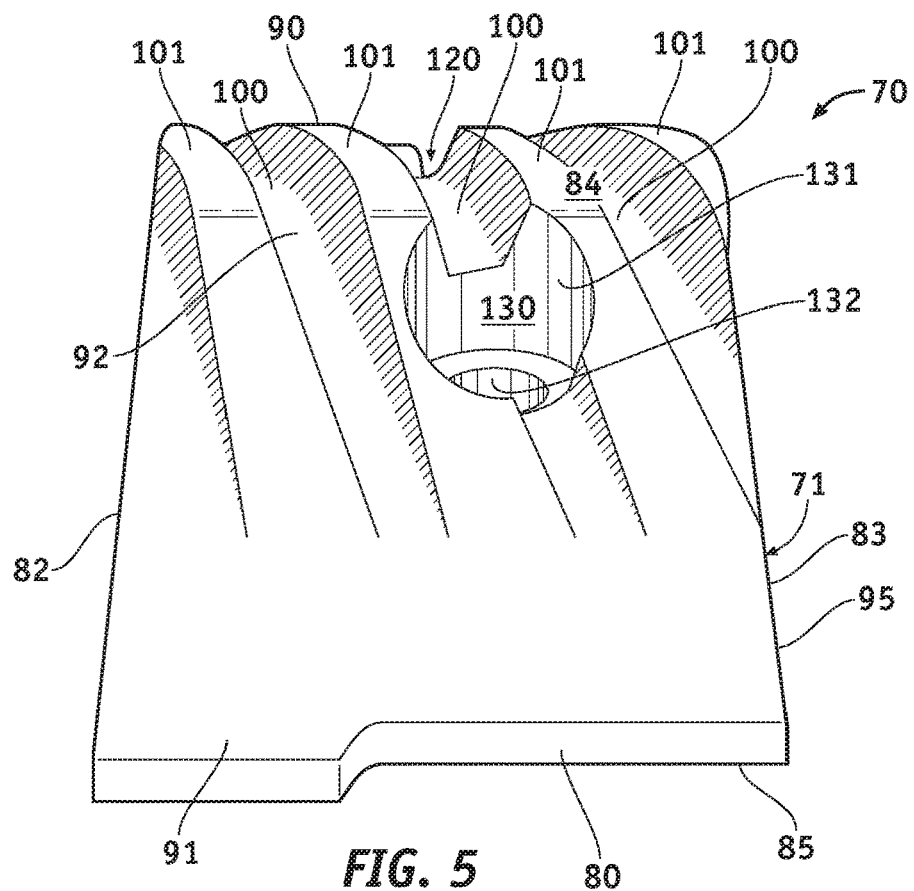
FIG. 5 is a front elevation view of the embodiment of FIG. 1.
Figure 6:
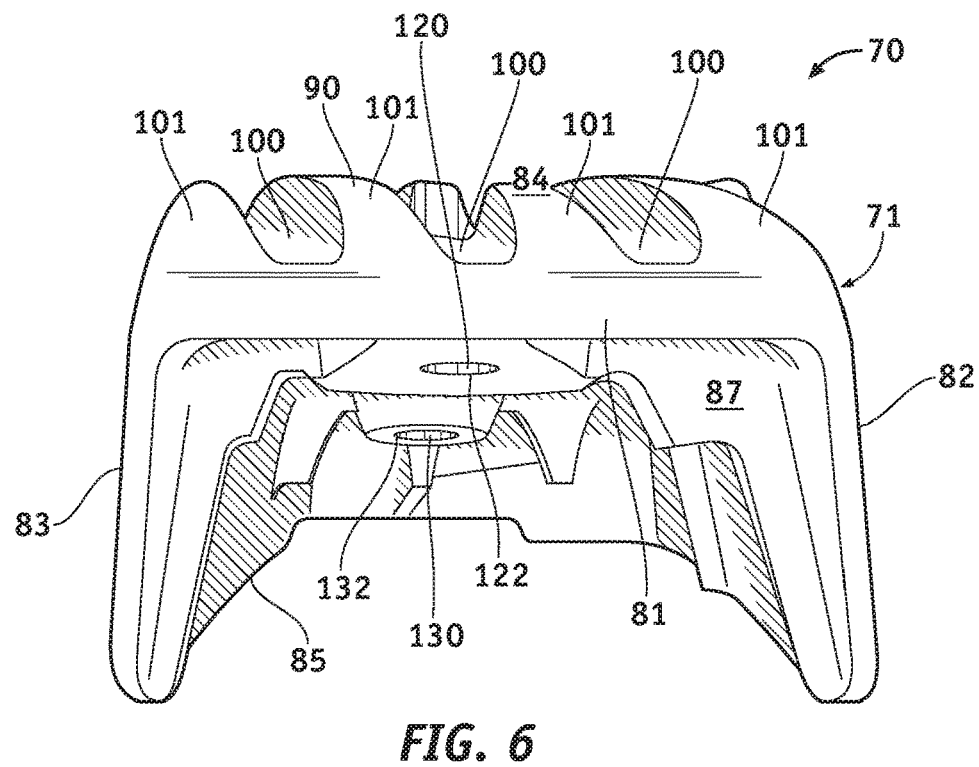
FIG. 6 is a rear elevation view of the embodiment of FIG. 1.
Figure 7:
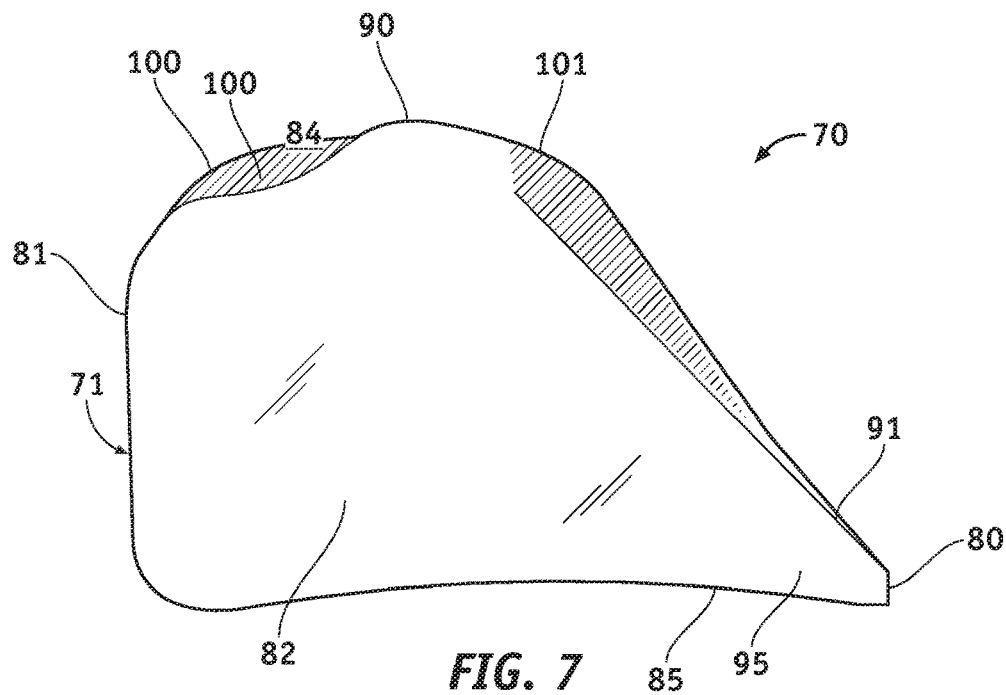
FIG. 7 is a right side elevation view of the embodiment of FIG. 1.
Figure 8:
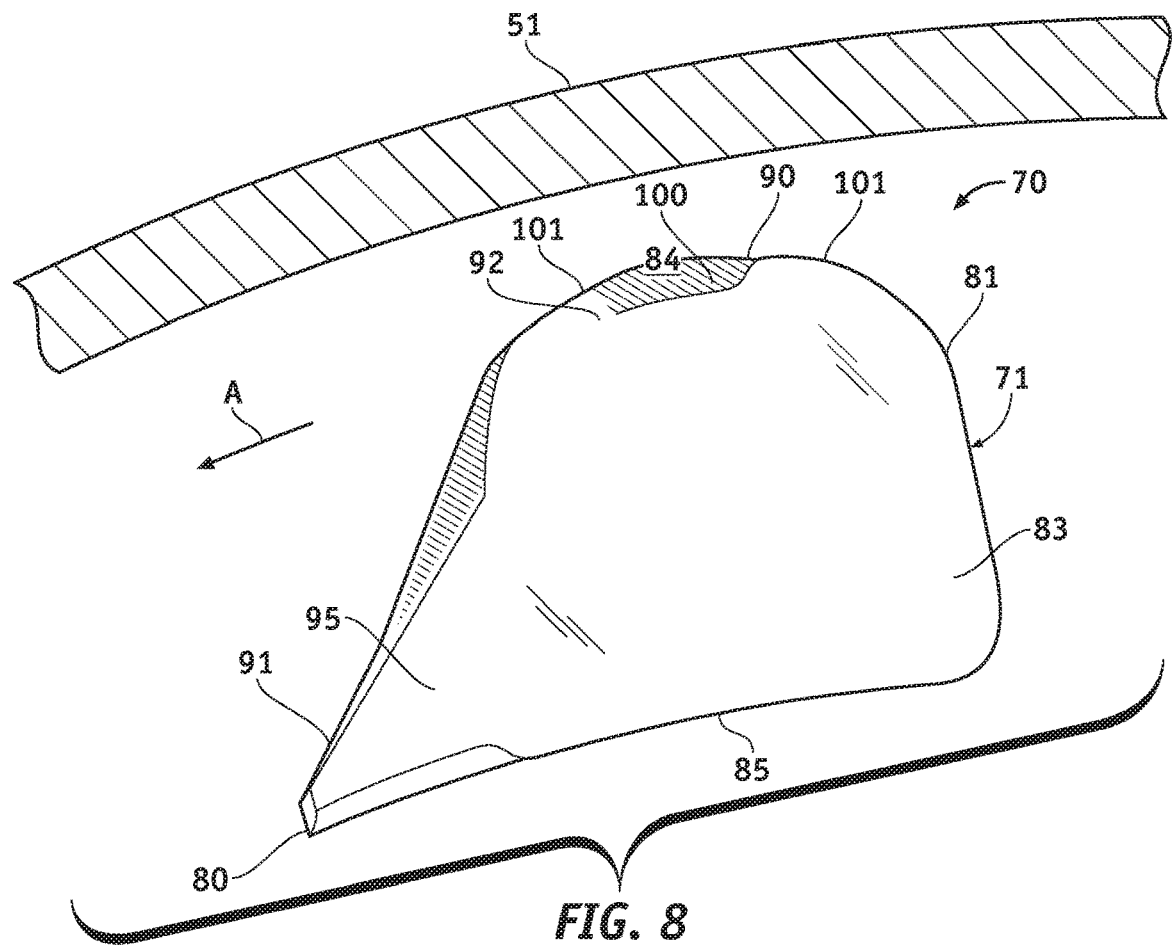
FIG. 8 is a left side elevation view of the embodiment of FIG. 1 shown as it would appear operatively positioned adjacent to a highly generalized section view of a thresher concave.

FIG. 1 is a front perspective view of threshing bar 70. A population threshing bars 70 applied to cylindrical exterior 61 of threshing drum 60 together form an exemplary thresher embodiment of the invention in FIGS. 9 and 10. FIG. 2 is a rear perspective view of threshing bar 70, FIG. 3 is a top plan view of threshing bar 70, FIG. 4 is a bottom plan view of threshing bar 70, FIG. 5 is a front elevation view of threshing bar 70, FIG. 6 is a rear elevation view of threshing bar 70, FIG. 7 is a right or upstream side elevation view of threshing bar 70, and FIG. 8 is a left or downstream side elevation view of threshing bar 70 shown as it would appear operatively positioned with respect to a highly generalized section view of thresher concave 51.

Referring in relevant part to FIGS. 1-8, threshing bar 70 consists of a rigid, integral, unitary threshing body or fixture 71, which is formed, such as by molding or machining, entirely of a metal. The metal of fixture 71 is cast iron, specifically grey cast iron having a known inherent tensile strength. Threshing fixture 71 has leading edge 80 defining a leading extremity of threshing fixture 71 and opposed trailing end or extremity 81, opposed outer or end faces/ surfaces 82 and 83, top threshing side 84 and opposed bottom threshing drum emplacement side 85 that defines a hollow space or cavity 87. Leading edge 80 has width W1 that extends from end face 82 to end face 83 and trailing end 81 has width W2 that extends from end face 82 to end face 83.

Outer or end face 82 is at the upstream side of threshing fixture 71 and is considered the upstream face/surface of threshing fixture 71. Outer or end face 83 is at the downstream side of threshing fixture 71 and is considered the downstream face/surface of threshing fixture 71. End face 82 on the upstream side of threshing fixture 71 extends between top threshing side 84 and opposed bottom threshing drum emplacement side 85 from leading edge 80 to trailing end 81. End face 83 on the downstream side of threshing fixture 71 extends between top threshing side 84 and opposed bottom threshing drum emplacement side 85 from leading edge 80 to trailing end 81.

Top threshing side 84 includes two main surface or face components, namely, a rearward trailing threshing surface or face denoted at 90 and a forward leading threshing surface or face denoted at 91. Trailing threshing face 90 meets leading threshing face 91 at a corner 92 formed in top threshing side 84, which means that trailing threshing face 90 is contiguous with leading threshing face 91 in that trailing threshing face 90 touches leading threshing face 91 at, and along the length of, corner 92. Corner 92 is rounded and blunt in this example, being not sharp, is located between, and is parallel with respect to, leading edge 80 and trailing end 81 of threshing fixture 71, and extends along top threshing side 84 from end face 82 to end face 83. Trailing threshing face 90 is a working, threshing, or rasping face and is broad and exposed and extends between opposed end faces 82 and 83 and between trailing end 81 and corner 92. Leading threshing face 91 is a working, threshing, or rasping face and is broad and exposed like trailing threshing face 90, and extends between opposed end faces 82 and 83 of threshing fixture 71 and between corner 92 and leading edge 80. Leading and trailing threshing faces 90 and 91 intersect at corner 92. Leading threshing face 91 inclines downwardly away from and relative to trailing threshing face 90 from corner 92 at an average downward incline of 40 degrees and meets, and cooperates with, bottom threshing drum emplacement side 85 and opposed end faces 82 and 83 of threshing fixture 71 at leading edge 80 to form a wedge 95 in threshing fixture 71, which characterized the forward or leading end of threshing fixture 71 opposing trailing end 81 of fixture 71. Leading threshing face 91 inclines downwardly from and relative to trailing threshing face 90 from corner 92 at an average incline of 40 degrees to provide the best or most favorable threshing action along leading threshing face 91. According to the principle of the invention, a preferred range of average inclination of leading threshing face 91 relative to trailing threshing face 90 is from 35 degrees to 45 degrees.

End face 82 extends between trailing and leading threshing faces 90 and 91 of top threshing side 84 and bottom threshing drum emplacement side 85 of threshing fixture 71 from trailing end 81 to leading edge 80, tapers from corner 92 to leading edge 80, and is in-turned or otherwise angled inwardly in the direction of end face 83 from proximate to trailing end 81 to leading edge 80 of threshing fixture 71 forming an oblique crop material deflecting surface of threshing fixture 71, namely, the end face 82 of threshing fixture 71 that is in-turned or otherwise inwardly-angled toward end face 83. Width W2 of trailing end 81 is greater than width W1 of leading edge 80. In an illustrative embodiment, end face 82 is in-turned from and relative to trailing end 81 at an average in-turn or angle of 15 degrees and this provides a chosen deflecting action along end face 82. A preferred range of an average in-turn or angle of end face 82 relative to trailing end 81 is from 10 degrees to 30 degrees.

Top threshing side 84 is configured with a crop-threshing rasp or rasp structure. The rasp structure is formed in and along trailing and leading threshing faces 90 and 91 and can take on a variety of forms. In this example, the rasp structure includes alternating crop threshing grooves 100 and vanes 101. Grooves 100 are formed in top threshing side 84 of threshing fixture 71, which form and are separated by corresponding upstanding vanes 101. Vanes 101 are elongate and have an equal and generally uniform height and width relative to each other, and grooves 100 are similarly elongate and correspond in length to the lengths of the corresponding vanes 101 and have a generally equal and uniform width and depth relative to each other. Grooves 100 and corresponding vanes are formed in trailing threshing face 90 and leading threshing face 91. Grooves 100 101 and corresponding vanes 101 extend along threshing fixture 71 in a direction from trailing end 81 of threshing fixture 71 to leading edge 80 of threshing fixture 71. More specifically, grooves 100 and corresponding vanes 101 further extend along top threshing side 84 of threshing fixture 71 from trailing end 81 of threshing fixture 71 to corner 92 formed in top threshing side 84 of threshing fixture 71. Grooves 100 and corresponding vanes 101 further extend downwardly along leading threshing face 91 of top threshing side 84 of threshing fixture 71 from corner 92 and, in the present embodiment, terminate along leading threshing face 91 at an intermediate location relative to corner 92 and leading edge 80 of threshing fixture 71.

Grooves 100 and corresponding vanes 101 are parallel relative to each other and are oblique relative to leading edge 80 and trailing end 81. Grooves 100 and corresponding vanes 101 are downstream directed grooves and vanes in that they are angled away from end face 82 at the upstream side of threshing fixture 71 and toward end face 83 at the downstream side of threshing fixture 71. Grooves 100 and corresponding vanes 101 that form the rasp structure of threshing fixture 71 define crop material conveyance pathways that extend along or otherwise across top threshing side 84 of fixture 71 in the opposite direction along threshing fixture 71 being a direction from leading edge 80 to trailing end 81 and, more particularly, in an angled direction relative to end face 83 of fixture 71 toward trailing end 81 of fixture 71.

Figure 11:
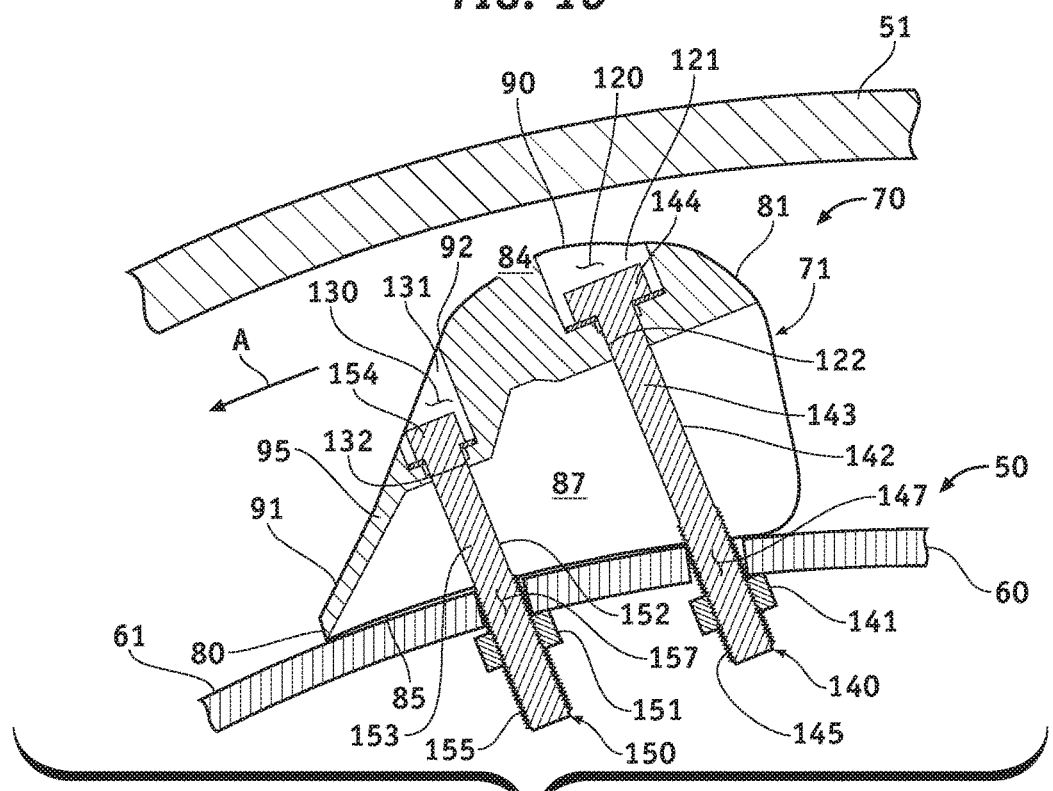
FIG. 11 is a section view taken along line 11-11 of FIG. 10.

Threshing fixture 71 is formed with two bores 120 and 130. Bores 120 and 130 are formed through fixture 71 from top threshing side 84 to bottom threshing drum emplacement side 85 and are configured to accept, as shown in FIG. 11, two corresponding nut-and-bolt fasteners 140 and 150 for securing threshing bar 70 to cylindrical exterior 61 of threshing drum 60 in FIG. 11 at two connection points. Bores 120 and 130 each provide a connection point, bore 120 defining a connection point for nut-and-bolt assembly 140 and bore 130 defining a connection point for nut-and-bolt assembly 150.

Referring in relevant part to FIGS. 1-4, 6, and 11, bore 120 extends through fixture 71 from trailing threshing face 90 to threshing drum emplacement side 85. Bore 120 is located at an intermediate position between end faces 82 and 83 and an intermediate position between trailing end 81 and corner 92. Bore 120 includes coaxial holes 121 and 122. Hole 121, a counterbore, is open to trailing threshing face 90 of top threshing side 84 and enlarges corresponding hole 122 open to bottom threshing drum emplacement side 85 and to cavity 87 defined by bottom threshing drum emplacement side 85. No more than one bore, bore 120 in this example, extends through fixture 71 from trailing threshing face 90 to threshing drum emplacement side 85 so as to not to disable or interfere with the threshing action carried out by trailing threshing face 90 of top threshing side 84.

Referring in relevant part to FIGS. 1, 3-6, and 11, bore 130 extends through fixture 71 from leading threshing face 91 to threshing drum emplacement side 85. Bore 120 is located at an intermediate position between end faces 82 and 83 and an intermediate position between trailing end 81 and corner 92. Bore 130 includes coaxial holes 131 and 132. Hole 131, a counterbore, is open to leading threshing face 91 of top threshing side 84 and enlarges corresponding hole 132 open to bottom threshing drum emplacement side 85 and to cavity 87 defined by bottom threshing drum emplacement side 85. No more than one bore, bore 130 in this example, extends through fixture 71 from leading threshing face 91 to threshing drum emplacement side 85 so as to not to disable or interfere with the threshing action carried out by leading threshing face 91 of top threshing side 84.

Bores 120 and 130 are arranged in a front-to-back direction from bore 130 proximate to the front of fixture 71 between leading edge 80 and corner 92 to bore 120 proximate to the rear or back of fixture 71 between corner 92 and trailing end 81. Accordingly, when nut-and-bolt assemblies 140 and 150 are applied to the respective bores 120 and 130, nut-and-bolt assemblies 140 and 150 are concurrently arranged in the front-to-back direction from nut-and-bolt assembly 140 applied to bore 130 between leading edge 80 and corner 92 to nut-and-bolt assembly 150 applied to bore 120 between corner 92 and trailing end 81.

In FIG. 11, nut-and-bolt assembly 140 consists of a nut 141 and a corresponding bolt 142 that includes an elongate shank 143 having a head 144 and an opposed threaded connecting end 145. Similarly, nut-and-bolt assembly 150 consists of a nut 151 and a corresponding bolt 152 that includes an elongate shank 153 having a head 154 and an opposed threaded connecting end 155.

In the installation of threshing bar 70 in FIG. 11, bottom threshing drum emplacement side 85 of threshing bar 70 is set onto cylindrical exterior 61 of threshing drum 60 and threshing side 84 of threshing bar 70 and the rasp structure formed therein faces outwardly toward and confronts thresher concave 51. Threshing bar 70 is positioned so as to direct leading edge 80 and leading threshing face 91 into the threshing direction of rotation of threshing drum 60 indicated by arrow A, so as to direct end face 82 toward the upstream end or location 50A of threshing drum 60 in FIG. 9, and so as to direct end face 83 toward the downstream end or location of threshing drum 60 in FIG. 9, whereby threshing bar 70 leads with leading edge 80 and trails with trailing end 81 and a crop applied between cylindrical exterior 61 of threshing drum 60 and thresher concave 51 is threshed by and between thresher concave 51 and top threshing side 84 of threshing bar 70 in response to rotation of threshing drum 60 in the threshing direction of rotation. Bottom threshing drum emplacement side 85 of threshing bar 70 is contoured to be received by cylindrical exterior 61 of threshing drum 60.

In the installation of nut-and-bolt assembly 140 as shown in FIG. 11, head 144 is set into and is received by hole 121, a counterbore, such that it is located under trailing threshing face 90 of top threshing side 84 so as not to disable or interfere with the threshing action carried out by trailing threshing face 90 of top threshing side 84. Shank 143 extends downwardly through hole 122 from head 144 fitted in hole 121 and into and through cavity 87 and away from bottom threshing drum emplacement side 85 to threaded connecting end 145, which is applied through an opening 147 formed through threshing drum 60. Nut 141 is threaded onto threaded connecting end 145 of shank 143 along the underside of threshing drum 60 and is tightened to firmly and rigidly secure threshing bar 70 in place relative to cylindrical exterior 61 of threshing drum 60 between head 144 and nut 141 proximate to the rear or back of fixture 71.

In the installation of nut-and-bolt assembly 150 as shown in FIG. 11, head 154 is set into and is received by hole 131, a counterbore, such that it is located under leading threshing face 91 of top threshing side 84 so as not to disable or interfere with the threshing action carried out by leading threshing face 91 of top threshing side 84. Shank 153 extends downwardly through hole 132 from head 154 fitted in hole 121 and into and through cavity 87 and away from bottom threshing drum emplacement side 85 to threaded connecting end 155, which is applied through an opening 157 formed through threshing drum 60. Nut 151 is threaded onto threaded connecting end 155 of shank 153 along the underside of threshing drum 60 and is tightened to firmly and rigidly secure threshing bar 70 in place relative to cylindrical exterior 61 of threshing drum 60 between head 154 and nut 151 proximate to the front of fixture 71.

When threshing bar 70 is secured to threshing drum 60 at two connection points by the two corresponding nut-and-bolt assemblies 140 and 150 applied to the respective bores 120 and 130 and secured to threshing drum 60 as described above, nut-and-bolt assemblies 140 and 150 cooperate or otherwise work in front-to-back, two-point coordination with one another from nut-and-bolt assembly 150 applied to bore 130 adjacent to the front of fixture 71 at leading threshing face 91 between leading edge 80 and corner 92 to nut-and-bolt assembly 140 applied to bore 120 adjacent to the back or rear of fixture 71 at trailing threshing face 90 between corner 92 and trailing end 81. This front-to-back, two-point coordination of nut-and-bolt assemblies 140 and 150 firmly and rigidly secures threshing bar 70 in place relative to cylindrical exterior 61 of threshing drum 60 and at the same time concurrently disables threshing bar 70 from both angularly displacing and rotating relative to cylindrical exterior surface 61 of threshing drum 60, according to the principle of the invention. While the front-to-back direction of orientation of bores 120 and 130 enables a corresponding front-to-back direction of orientation of nut-and-bolt assemblies 140 and 150 as described herein, the presence of no more than one bolt-receiving bore, bore 120 in this example, through fixture 71 from trailing threshing face 90 to threshing drum emplacement side 85 proximate to the rear or back of fixture 71 and the presence of no more than one bore, bore 130 in this example, through fixture 71 from leading threshing face 91 to threshing drum emplacement side 85 proximate to the front of fixture 71 does not disable or interfere with the threshing action carried out by the respective trailing and leading threshing faces 90 and 91, according to the principle of the invention. This applies to each threshing bar embodiment disclosed herein.

Figure 9:
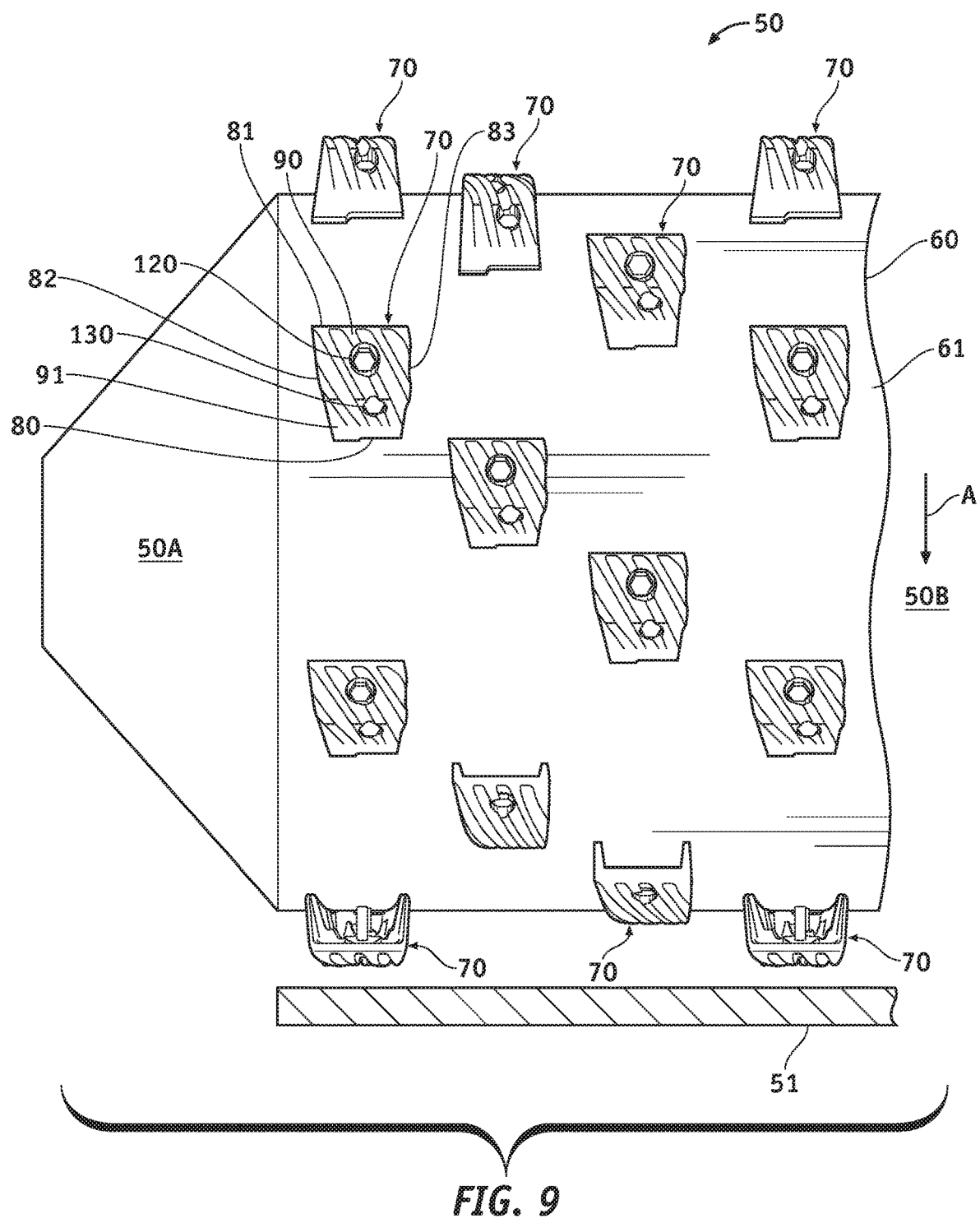
FIG. 9 is a fragmented, front elevation view of a thresher, including a threshing drum formed with threshing bars each according to the embodiment of FIG. 1, operatively positioned adjacent to a highly generalized section view of a thresher concave.
Figure 10:
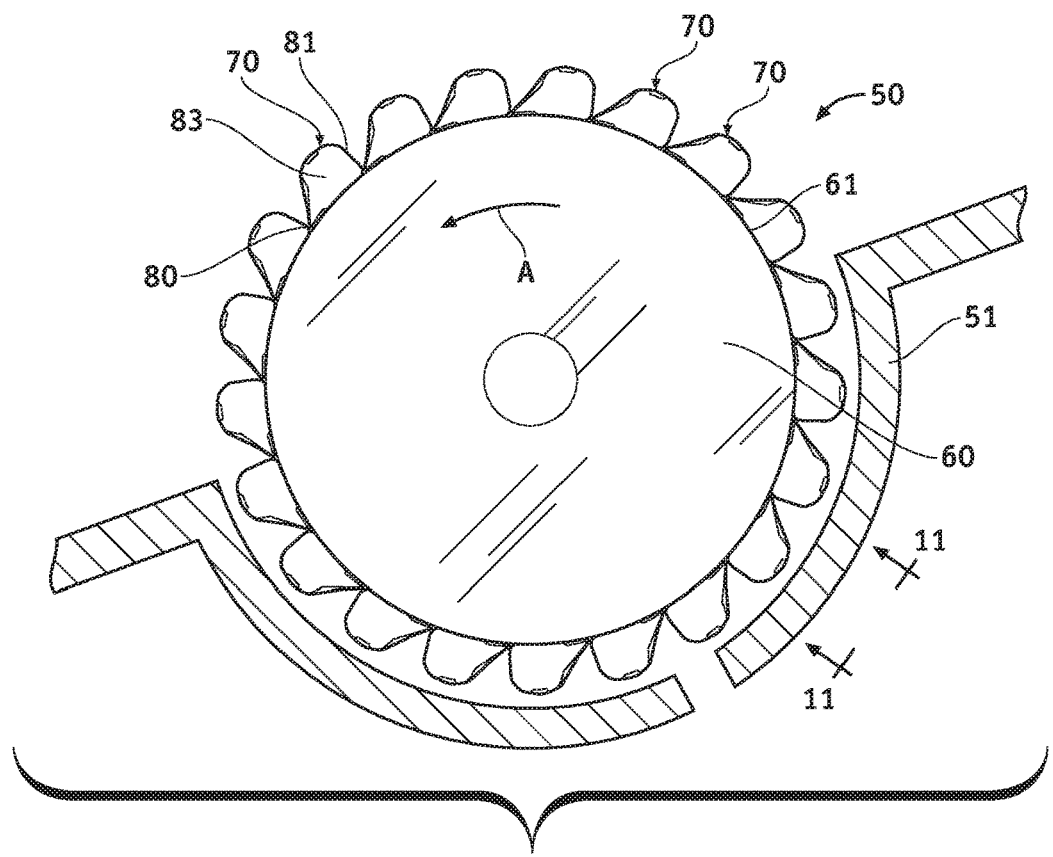
FIG. 10 is an enlarged, highly generalized side elevation view of the thresher and section view of the thresher concave of FIG. 9.

A population of threshing bars 70 is emplaced and affixed to cylindrical exterior of threshing drum 60, as generally depicted in FIGS. 9 and 10, to form an exemplary thresher 50 according to the principle of the invention. In FIG. 9, threshing bars are denoted at 70, and are shown set onto cylindrical exterior 61 of threshing drum 60 in preparation for threshing. Threshing bars 70 are positioned with their leading edges 80 and leading threshing faces 91 facing or otherwise directed into the threshing direction of rotation of threshing drum 60 indicated by arrow A so as to direct their end faces 82 toward the upstream location 50A of threshing drum 60, and so as to direct their end faces 83 toward the downstream location 50B of threshing drum 60. Crop material deflecting surfaces of threshing bars 70, end faces 82, face upstream location 50A of threshing drum 60, and are oblique relative to and angled toward both upstream location 50A of threshing drum the threshing direction of rotation of threshing drum 60 as indicated by arrow A. In response to rotation of threshing drum 60 in the threshing direction of rotation denoted by arrow A, threshing bars 70 lead with their leading edges 80 and trail with their trailing ends 81 and crop cuttings applied between cylindrical exterior 61 of threshing drum 60 and thresher concave 51 are threshed by and between the rasp structures formed in the top threshing sides 84 of threshing bars 70 and thresher concave 51 separating the grains from the chaff to form threshings, namely, the chaff and the separated grains. In the customary operation of the combine harvester, the grains fall through sieves into the collection tank inside the combine harvester.

In FIGS. 9, 10, and 11, as each threshing bar 70 is rotated by threshing drum 60 along the threshing direction of rotation over the crop cuttings received between top threshing side 84 of threshing bar 70 and thresher concave 51, the crop cuttings encounter top threshing side 84 from leading edge 80 to trailing end 81 and impact leading threshing face 91 and impact and encounter the rasp structure consisting of grooves 100 and corresponding vanes 101 applied along leading threshing face 91 and trailing threshing face 90 imparting a threshing action against the crop cuttings to form threshings. The previously described incline of leading threshing face 91 relative to trailing threshing face 90, and the grooves 100 and corresponding vanes 101 forming the rasp structure along leading threshing face 91 and trailing threshing face 90 cooperate to cause threshing bar 70 to perform an aggressive threshing of the crop cuttings. In fact, leading threshing face 91 faces upwardly toward thresher concave 51 and faces into the threshing direction of rotation of threshing drum 60 indicated by arrow A and inclines downwardly from trailing threshing face 90 to cylindrical exterior 61 of threshing drum at an average downward incline of 40 degrees relative to trailing threshing face 90. In response to rotation of threshing drum 60 in the threshing direction of rotation crop cuttings initially impact leading threshing face 91 at a steep and oblique impaction angle of 50-60 degrees and the defined incline of leading threshing face 91 as described thus provides an aggressive initial impaction against the crop cuttings in the threshing of such crop cuttings but not so aggressive so as to cause an initial over-threshing of the crop cuttings. The crop cuttings and threshings are forced along the vanes 101 and into and through the grooves 100 defining the crop material conveyance pathways of the rasp structure of threshing fixture 71 in a rearward direction from leading edge 80 to trailing end 81 and further in an angled direction from end face 83 of fixture 71 to trailing end 81 of fixture 71 and are thrust outwardly therefrom toward upstream location 50A of threshing drum 60 and away from end face 82, in response to movement of threshing bar 70 along the threshing direction of rotation of threshing drum 60 leading with leading edge 80. This thrusting of crop cuttings and threshings along and through the crop material conveyance pathways defined by the rasp structure of threshing fixture 71 toward upstream location 50A of threshing drum 60 slows the conveyance of this material along thresher 50 from upstream location 50A to downstream location 50B thereby prolonging the applied threshing action to the crop cuttings to provide a thorough, repeated, more prolonged, and aggressive threshing of the crop cuttings to be threshed as thresher 50 rotates. And so the rasp structure formed by grooves 100 and corresponding vanes 101 creates contact of the crop cuttings against the concave allowing more crop cuttings to rub together, and the rasp structure is aggressive and yet gentle on the crop cuttings to allow the crop cuttings to be managed through and along the crop material conveyance pathways formed by grooves 100 and corresponding vanes 101.

The rasp structure of threshing fixture 71 defined by grooves and corresponding vanes 101 as herein described reduces the possibility of over-threshing, prevents cracks and splits in seed coats, and is suitable for all crops, and especially corn, beans, and small grain crops. The presence of no more than one bolt-receiving bore, bore 120 in this example, through fixture 71 from trailing threshing face 90 to threshing drum emplacement side 85 proximate to the back or rear of fixture 71 and the presence of no more than one bore, bore 130 in this example, through fixture 71 from leading threshing face 91 to threshing drum emplacement side 85 proximate to the front of fixture 71 does not disable or interfere with the threshing action carried out by the respective trailing and leading threshing faces 90 and 91, according to the principle of the invention. The front-to-back, two-point coordination of nut-and-bolt assemblies 140 and 150 firmly and rigidly secure threshing bar 70 in place relative to cylindrical exterior 61 of threshing drum 60 and disables threshing bar 70 from both angularly displacing and rotating out of position relative to cylindrical exterior surface 61 of threshing drum 60 during threshing operations.

Threshing bar 70 incorporates a particular type of rasp structure that is structured to perform a crop-threshing function. While the rasp structure of threshing bar 70 is instructive of a particular type of rasp structure, top threshing side 84 of threshing bar 70 can be configured with other configurations of rasp structures.

B

Figure 12:
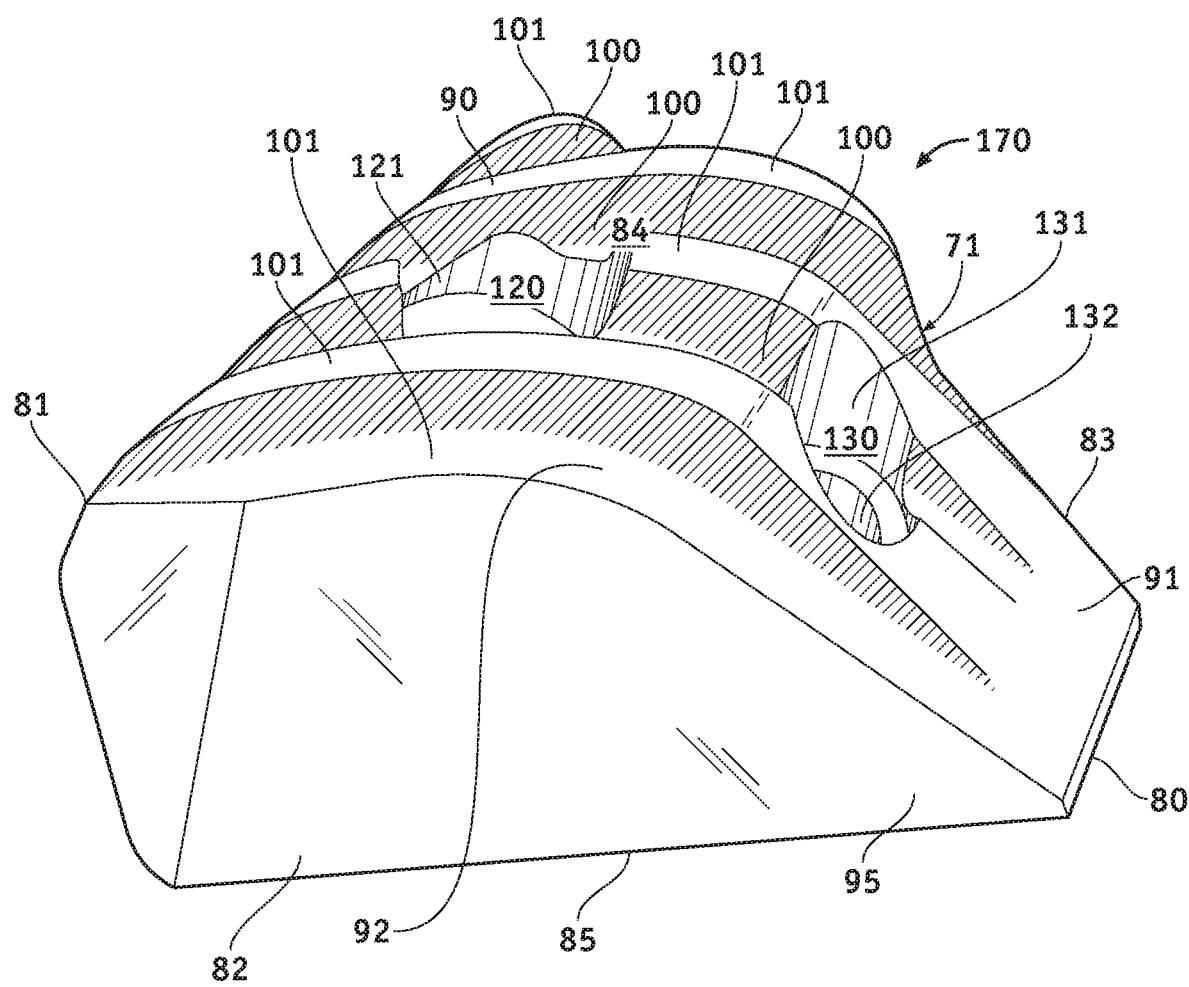
FIG. 12 is a front perspective view of another embodiment of a threshing bar constructed and arranged according to the invention.
Figure 13:
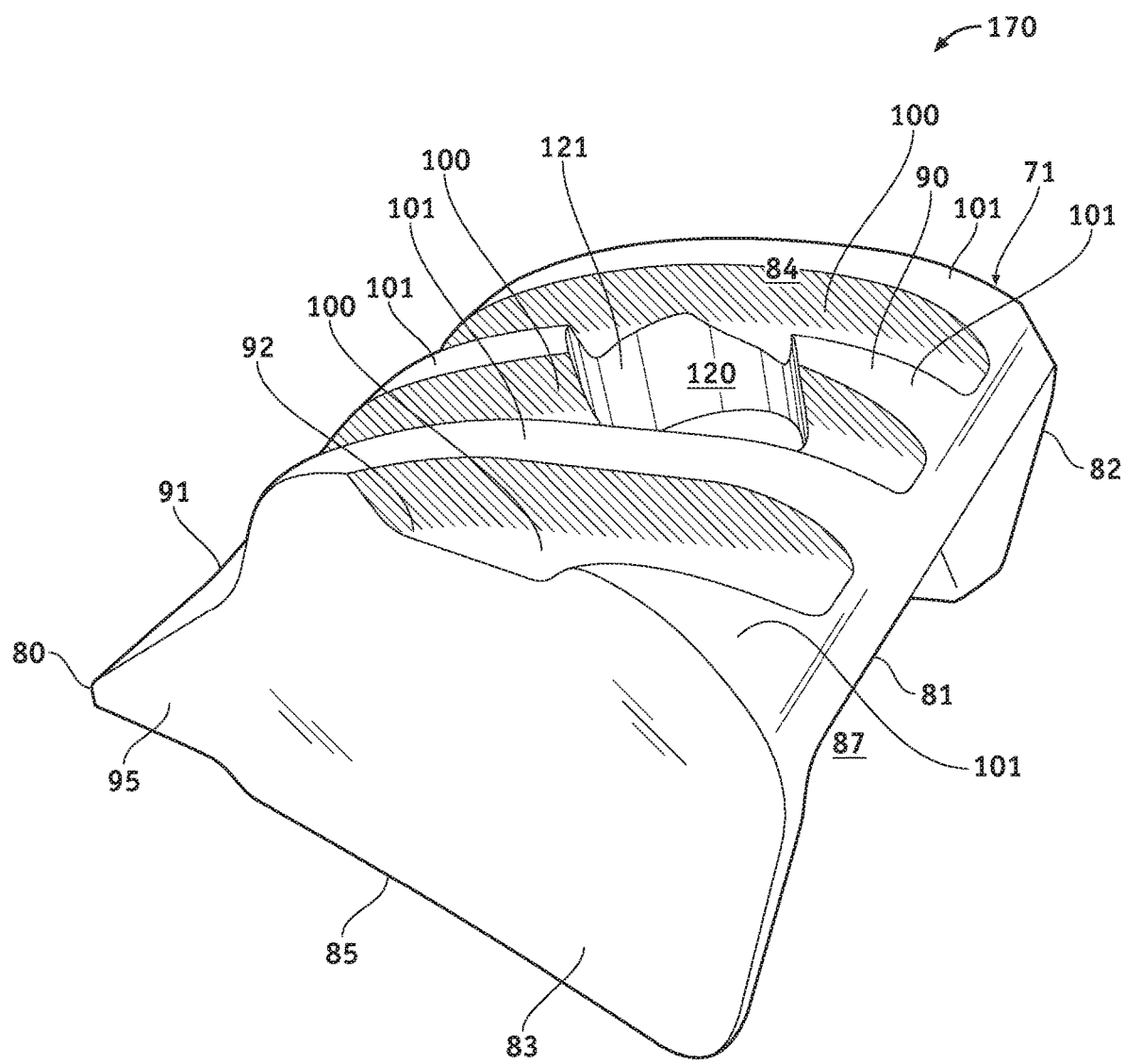
FIG. 13 is a rear perspective view of the embodiment of FIG. 12.
Figure 14:
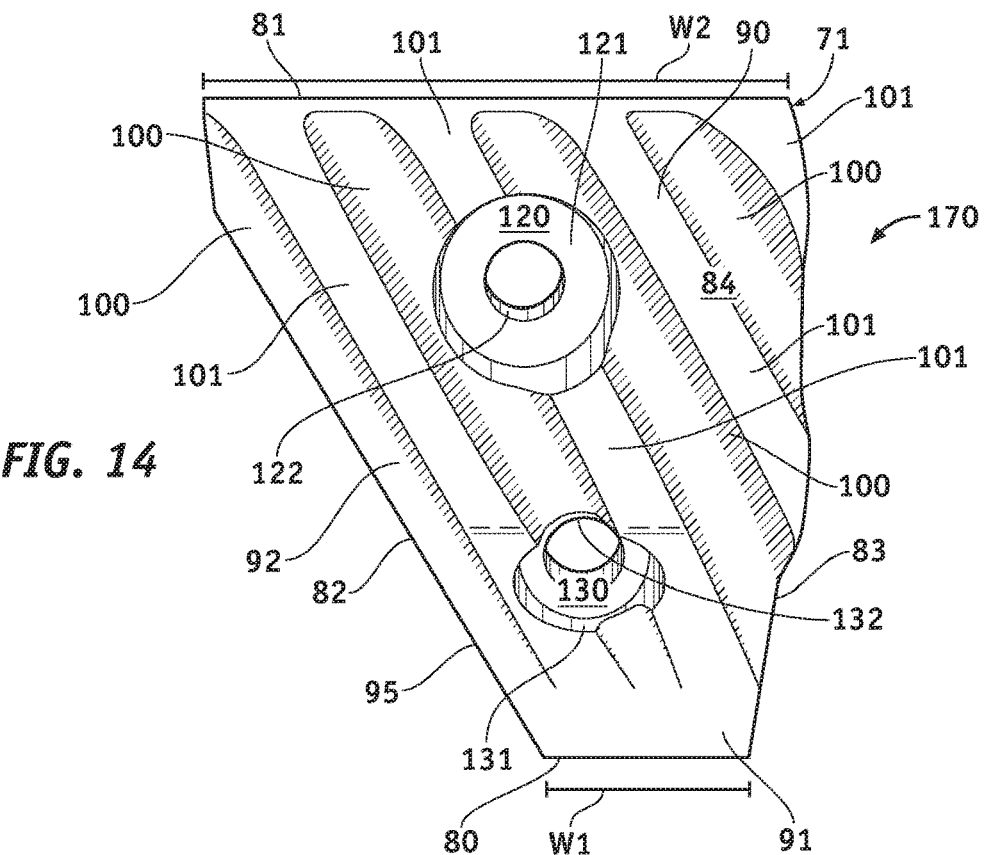
FIG. 14 is a top plan view of the embodiment of FIG. 12.
Figure 15:
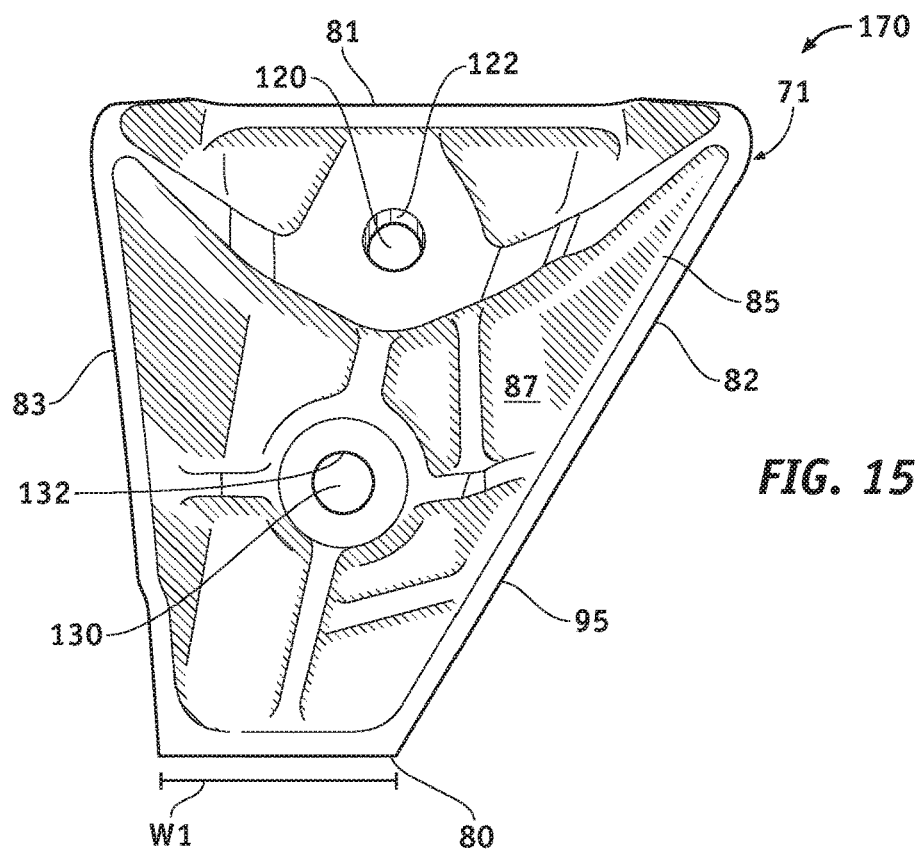
FIG. 15 is a bottom plan view of the embodiment of FIG. 12.
Figure 16:
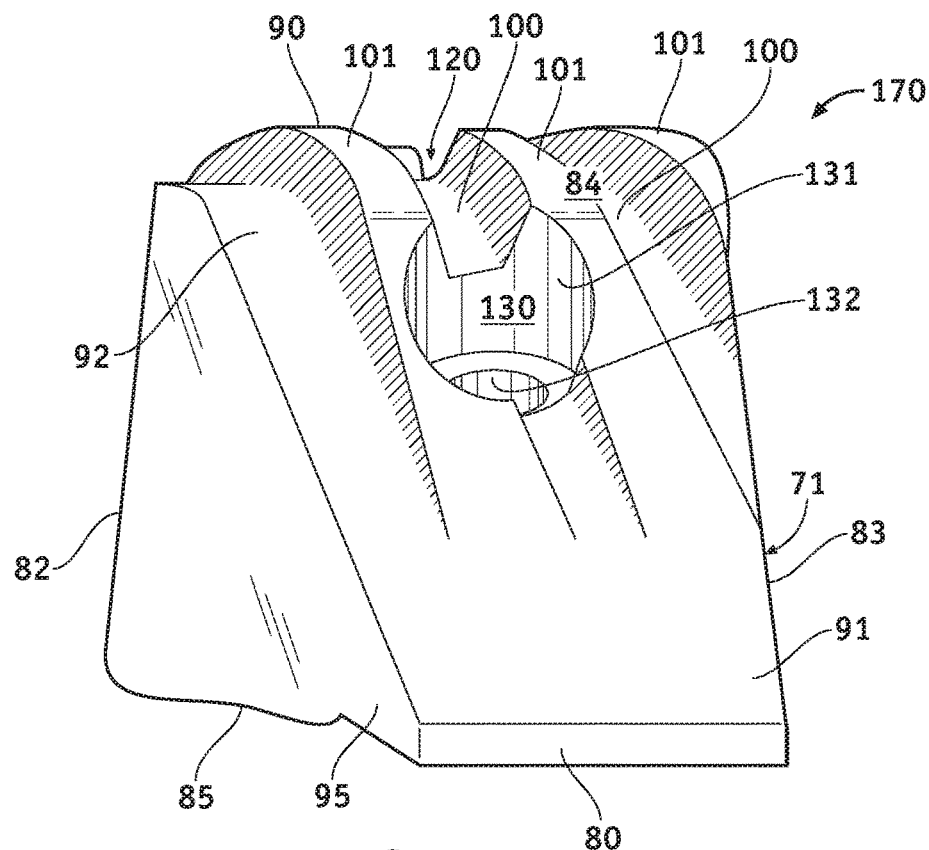
FIG. 16 is a front elevation view of the embodiment of FIG. 12.
Figure 17:
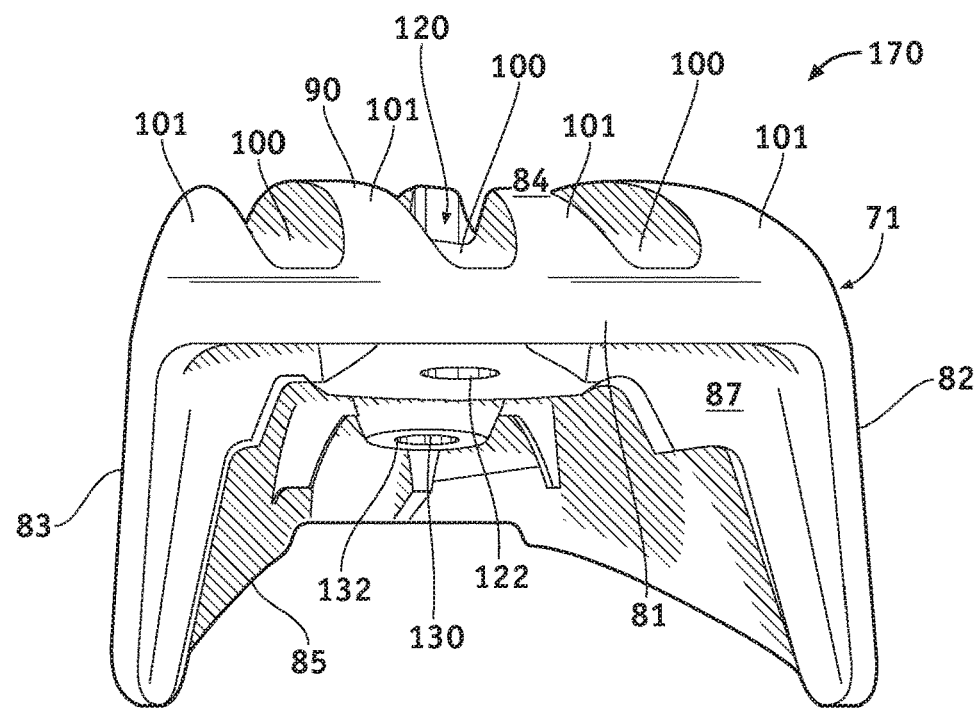
FIG. 17 is a rear elevation view of the embodiment of FIG. 12.
Figure 18:
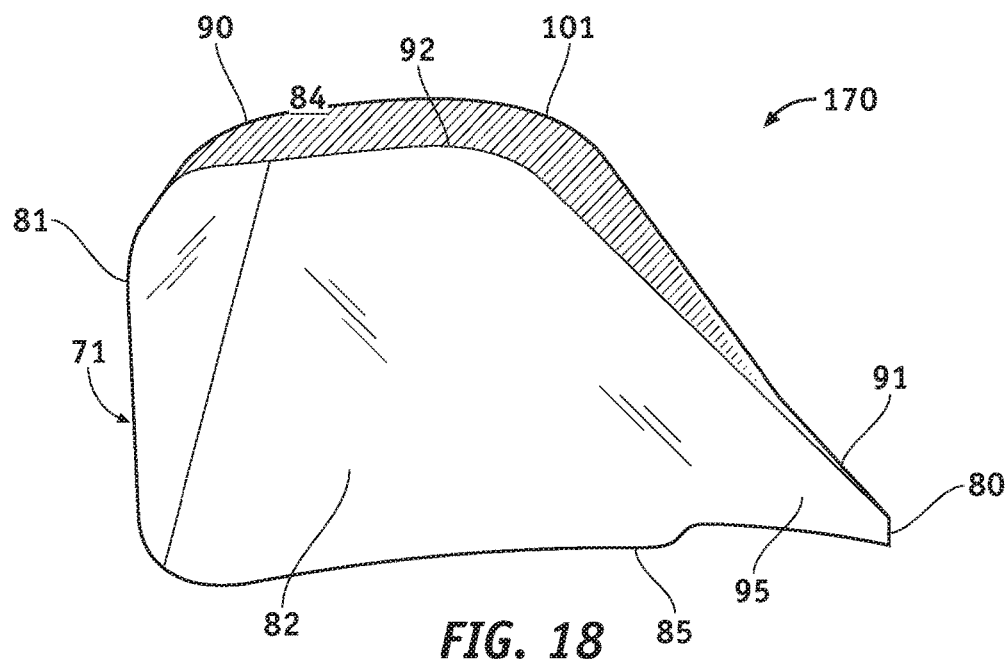
FIG. 18 is a right side elevation view of the embodiment of FIG. 12.
Figure 19:
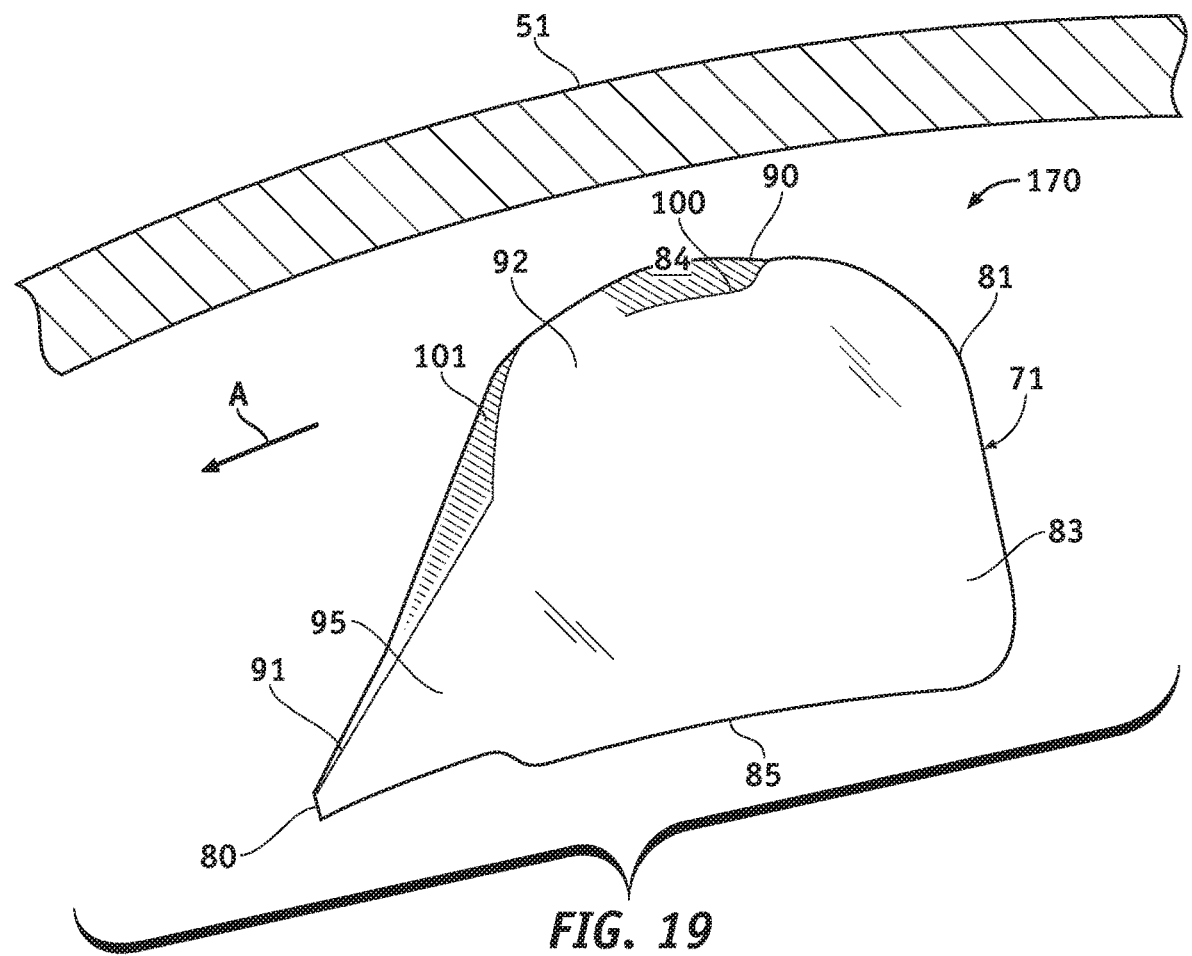
FIG. 19 is a left side elevation view of the embodiment of FIG. 12 shown as it would appear operatively positioned adjacent to a highly generalized section view of a thresher concave.

FIGS. 12-19 illustrate another embodiment of a threshing bar 170 constructed and arranged in accordance with the principle of the invention. FIG. 12 is a front perspective view of threshing bar 170. A population threshing bars 170 applied to cylindrical exterior 61 of threshing drum 60 together form an exemplary thresher embodiment of the invention in FIGS. 20 and 21. FIG. 13 is a rear perspective view of threshing bar 170, FIG. 14 is a top plan view of threshing bar 170, FIG. 15 is a bottom plan view of threshing bar 170, FIG. 16 is a front elevation view of threshing bar 170, FIG. 17 is a rear elevation view of threshing bar 170, FIG. 18 is a right or upstream side elevation view of threshing bar 170, and FIG. 19 is a left or downstream side elevation view of threshing bar 170 shown as it would appear operatively positioned with respect to a highly generalized section view of thresher concave 51.

Referencing FIGS. 12-19 in relevant part, threshing bar 170 is smaller and somewhat different from threshing bar 70 in overall shape, but in structure is common to threshing bar 70 in that threshing bar 170 shares fixture 71, leading edge 80 having width W1, trailing end 81 having width W2 that is greater than width W1 of leading edge 80, upstream face 82, downstream face 83, top threshing side 84, bottom threshing drum emplacement side 85, cavity 87 trailing threshing face 90, leading threshing face 91, corner 92, wedge 95, grooves 100 and vanes 101 defining the crop threshing rasp structure of top threshing side 84, bore 120 including coaxial holes 121 and 122 configured to accommodate nut-and-bolt assembly 140, and bore 130 including coaxial holes 131 and 132 configured to accommodate nut-and-bolt assembly 150. Since threshing bar 170 is smaller and somewhat different from threshing bar 70 in overall shape, the crop-threshing characteristics of threshing bar 170 are less aggressive compared to threshing bar 70.

Bore 120 extends through fixture 71 from trailing threshing face 90 to threshing drum emplacement side 85, and is located at an intermediate position between end faces 82 and 83 and an intermediate position between trailing end 81 and corner 92 proximate to the back or rear of fixture 71. No more than one bore, bore 120 in this example, extends through fixture 71 from trailing threshing face 90 to threshing drum emplacement side 85 proximate to the back or rear of fixture 71 so as to not to disable or interfere with the threshing action carried out by trailing threshing face 90 of top threshing side 84.

Bore 130 extends through fixture 71 from leading threshing face 91 to threshing drum emplacement side 85, and is located at an intermediate position between end faces 82 and 83 and an intermediate position between leading edge 80 and corner 92 proximate to the front of fixture 71. No more than one bore, bore 130 in this example, extends through fixture 71 from leading threshing face 91 to threshing drum emplacement side 85 proximate to the front of fixture 71 so as to not to disable or interfere with the threshing action carried out by leading threshing face 91 of top threshing side 84.

Like threshing bar 70, bores 120 and 130 of threshing bar 170 are arranged in the front-to-back direction from bore 130 between leading edge 80 and corner 92 to bore 120 between corner 92 and trailing end 81. Accordingly, when nut-and-bolt assemblies 140 and 150 are applied to the respective bores 120 and 130, nut-and-bolt assemblies 140 and 150 are concurrently arranged in the front-to-back direction from nut-and-bolt assembly 140 applied to bore 130 between leading edge 80 and corner 92 to nut-and-bolt assembly 150 applied to bore 120 between corner 92 and trailing end 81.

Figure 22:
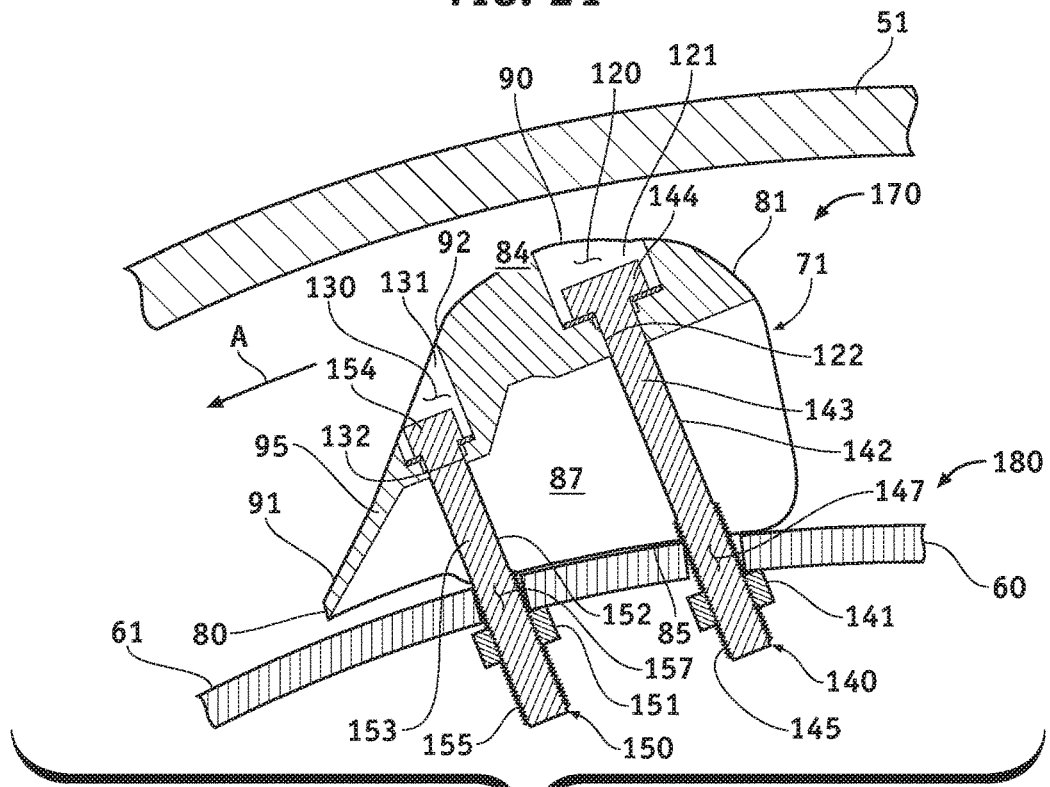
FIG. 22 is a section view taken along line 22-22 of FIG. 21.

In the installation of threshing bar 170 in FIG. 22, bottom threshing drum emplacement side 85 of threshing bar 170 is set onto cylindrical exterior 61 of threshing drum 60, and threshing side 84 of threshing bar 170 and the rasp structure formed therein faces outwardly toward and confronts thresher concave 51. Threshing bar 170 is positioned so as to direct leading edge 80 and leading threshing face 91 into the threshing direction of rotation of threshing drum 60 indicated by arrow A, so as to direct end face 82 toward the upstream end or location 50A of threshing drum 60 in FIG. 20, and so as to direct end face 83 toward the downstream end or location of threshing drum 60 in FIG. 20, whereby threshing bar 170 leads with leading edge 80 and trails with trailing end 81 and a crop applied between cylindrical exterior 61 of threshing drum 60 and thresher concave 51 is threshed by and between thresher concave 51 and top threshing side 84 of threshing bar 170 in response to rotation of threshing drum 60 in the threshing direction of rotation. Bottom threshing drum emplacement side 85 of threshing bar 170 is contoured to be received by cylindrical exterior 61 of threshing drum 60.

In the installation of nut-and-bolt assembly 140 as shown in FIG. 22, head 144 is set into and is received by hole 121, a counterbore, such that it is located under trailing threshing face 90 of top threshing side 84 so as not to disable or interfere with the threshing action carried out by trailing threshing face 90 of top threshing side 84. Shank 143 extends downwardly through hole 122 from head 144 fitted in hole 121 and into and through cavity 87 and away from bottom threshing drum emplacement side 85 to threaded connecting end 145, which is applied through an opening 147 formed through threshing drum 60. Nut 141 is threaded onto threaded connecting end 145 of shank 143 along the underside of threshing drum 60 and is tightened to firmly and rigidly secure threshing bar 170 in place relative to cylindrical exterior 61 of threshing drum 60 between head 144 and nut 141.

In the installation of nut-and-bolt assembly 150 as shown in FIG. 22, head 154 is set into and is received by hole 131, a counterbore, such that it is located under leading threshing face 91 of top threshing side 84 so as not to disable or interfere with the threshing action carried out by leading threshing face 91 of top threshing side 84. Shank 153 extends downwardly through hole 132 from head 154 fitted in hole 121 and into and through cavity 87 and away from bottom threshing drum emplacement side 85 to threaded connecting end 155, which is applied through an opening 157 formed through threshing drum 60. Nut 151 is threaded onto threaded connecting end 155 of shank 153 along the underside of threshing drum 60 and is tightened to firmly and rigidly secure threshing bar 170 in place relative to cylindrical exterior 61 of threshing drum 60 between head 154 and nut 151.

When threshing bar 170 is secured to threshing drum 60 at the two connection points by the two corresponding nut-and-bolt assemblies 140 and 150 applied to the respective bores 120 and 130 and secured to threshing drum 60 as described above, nut-and-bolt assemblies 140 and 150 cooperate or otherwise work in the previously described front-to-back, two-point coordination with one another from nut-and-bolt assembly 150 applied to bore 130 adjacent to the front of fixture 71 at leading threshing face 91 between leading edge 80 and corner 92 to nut-and-bolt assembly 140 applied to bore 120 adjacent to the back or rear of fixture 71 at trailing threshing face 90 between corner 92 and trailing end 81. This front-to-back, two-point coordination of nut-and-bolt assemblies 140 and 150 firmly and rigidly secures threshing bar 170 in place relative to cylindrical exterior 61 of threshing drum 60 and at the same time concurrently disables threshing bar 170 from both angularly displacing and rotating relative to cylindrical exterior surface 61 of threshing drum 60, according to the principle of the invention. While the front-to-back direction of orientation of bores 120 and 130 enables a corresponding front-to-back direction of orientation of nut-and-bolt assemblies 140 and 150 as described herein, the presence of no more than one bolt-receiving bore, bore 120 in this example, through fixture 71 from trailing threshing face 90 to threshing drum emplacement side 85 proximate to the rear or back of fixture 71 and the presence of no more than one bore, bore 130 in this example, through fixture 71 from leading threshing face 91 to threshing drum emplacement side 85 proximate to the front of fixture 71 does not disable or interfere with the threshing action carried out by the respective trailing and leading threshing faces 90 and 91, according to the principle of the invention.

Figure 20:
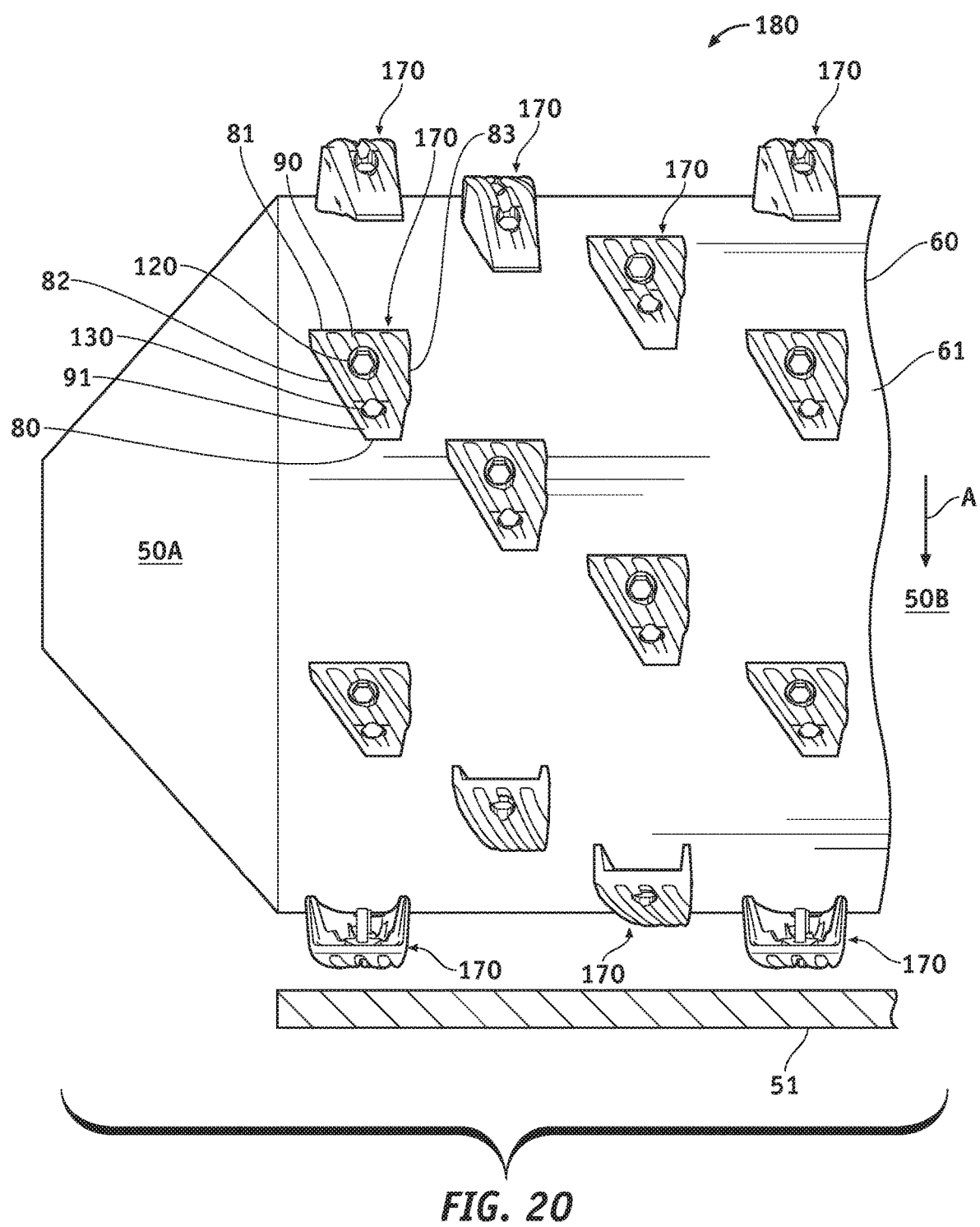
FIG. 20 is a fragmented, front elevation view of a thresher, including a threshing drum formed with threshing bars each according to the embodiment of FIG. 12, operatively positioned adjacent to a highly generalized section view of a thresher concave.
Figure 21:
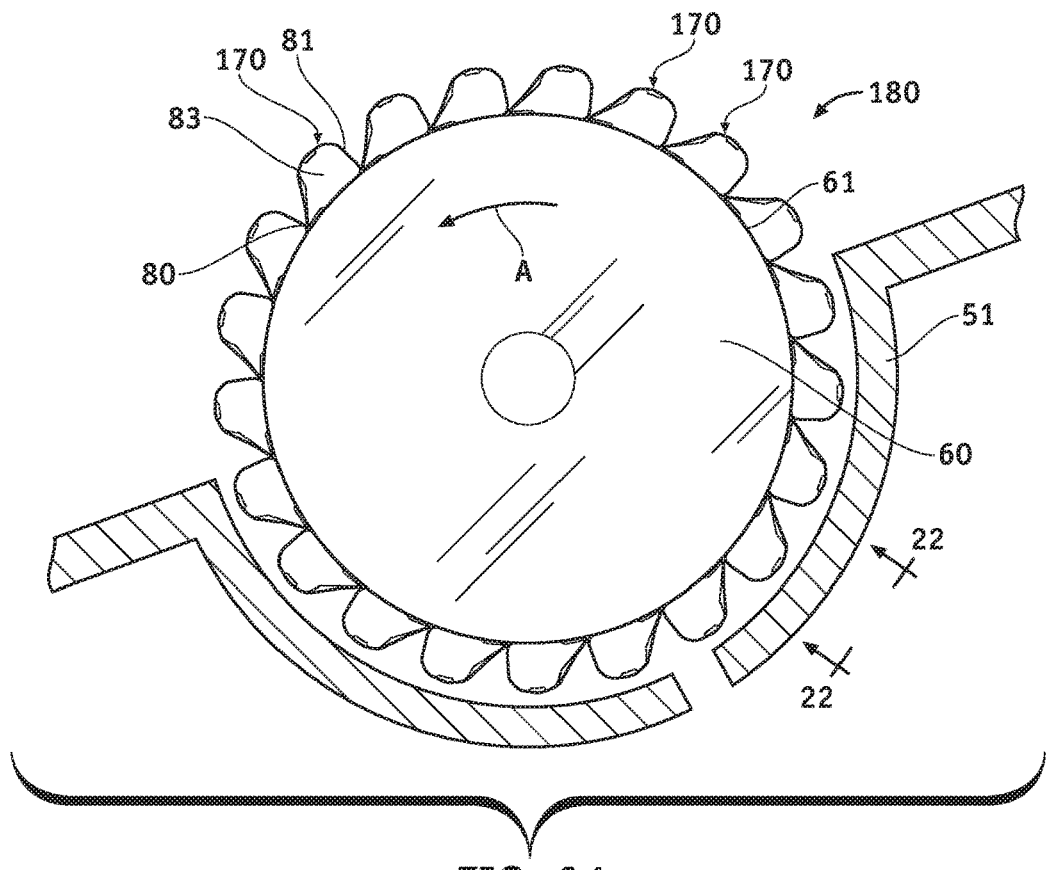
FIG. 21 is an enlarged, highly generalized side elevation view of the thresher and section view of the thresher concave of FIG. 20.

A population of threshing bars 170 is emplaced and affixed to cylindrical exterior of threshing drum 60, as generally depicted in FIGS. 20 and 21, to form an exemplary thresher 180 according to the principle of the invention. In FIG. 20, threshing bars are denoted at 170, and are shown set onto cylindrical exterior 61 of threshing drum 60 in preparation for threshing. Threshing bars 170 are positioned with their leading edges 80 and leading threshing faces 91 facing or otherwise directed into the threshing direction of rotation of threshing drum 60 indicated by arrow A so as to direct their end faces 82 toward the upstream location 50A of threshing drum 60, and so as to direct their end faces 83 toward the downstream location 50B of threshing drum 60. The crop material deflecting surfaces of threshing bars 170, end faces 82, face upstream location 50A of threshing drum 60, and are oblique relative to and angled toward both upstream location 50A of threshing drum the threshing direction of rotation of threshing drum 60 as indicated by arrow A. In response to rotation of threshing drum 60 in the threshing direction of rotation denoted by arrow A, threshing bars 170 lead with their leading edges 80 and trail with their trailing ends 81 and crop cuttings applied between cylindrical exterior 61 of threshing drum 60 and thresher concave 51 are threshed by and between the rasp structures formed in the top threshing sides 84 of threshing bars 170 and thresher concave 51 separating the grains from the chaff to form threshings, namely, the chaff and the separated grains. In the customary operation of the combine harvester, the grains fall through sieves into the collection tank inside the combine harvester.

In FIGS. 20, 21, and 22, as each threshing bar 170 is rotated by threshing drum 60 along the threshing direction of rotation over the crop cuttings received between top threshing side 84 of threshing bar 170 and thresher concave 51, the crop cuttings encounter top threshing side 84 from leading edge 80 to trailing end 81 and impact leading threshing face 91 and impact and encounter the rasp structure consisting of grooves 100 and corresponding vanes 101 applied along leading threshing face 91 and trailing threshing face 90 imparting a threshing action against the crop cuttings to form threshings. The incline of leading threshing face 91 relative to trailing threshing face 90, and the grooves 100 and corresponding vanes 101 forming the rasp structure along leading threshing face 91 and trailing threshing face 90 cooperate to cause threshing bar 170 to perform an aggressive threshing of the crop cuttings to be threshed. Leading threshing face 91 faces upwardly toward thresher concave 51 and faces into the threshing direction of rotation of threshing drum 60 indicated by arrow A and inclines downwardly from trailing threshing face 90 to cylindrical exterior 61 of threshing drum 60 at an average downward incline of 40 degrees relative to trailing threshing face 90, and in response to rotation of threshing drum 60 in the threshing direction of rotation crop cuttings initially impact leading threshing face 91 at a steep and oblique impaction angle of 50-60 degrees and the defined incline of leading threshing face 91 as previously described thus provides an aggressive initial impaction against the crop cuttings in the threshing of such crop cuttings but not so aggressive so as to cause an initial over-threshing of the crop cuttings. The crop cuttings and threshings are forced along the vanes 101 and into and through the grooves 100 defining the crop material conveyance pathways of the rasp structure of threshing fixture 71 in a rearward direction from leading edge 80 to trailing end 81 and further in an angled direction from end face 83 of fixture 71 to trailing end 81 of fixture 71 and are thrust outwardly therefrom toward upstream location 50A of threshing drum 60 and away from end face 82, in response to movement of threshing bar 170 along the threshing direction of rotation of threshing drum 60 leading with leading edge 80. This thrusting of crop cuttings and threshings along and through the crop material conveyance pathways defined by the rasp structure of threshing fixture 71 toward upstream location 50A of threshing drum 60 slows the conveyance of this material along thresher 50 from upstream location 50A to downstream location 50B thereby prolonging the applied threshing action to the crop cuttings to provide a thorough, repeated, more prolonged, and aggressive threshing of the crop cuttings to be threshed as thresher 50 rotates. And so the rasp structure formed by grooves 100 and corresponding vanes 101 creates contact of the crop cuttings against the concave allowing more crop cuttings to rub together, and the rasp structure is aggressive and yet gentle on the crop cuttings to allow the crop cuttings to be managed through and along the crop material conveyance pathways formed by grooves 100 and corresponding vanes 101.

The rasp structure of threshing fixture 71 defined by grooves and corresponding vanes 101 as herein described reduces the possibility of over-threshing, prevents cracks and splits in seed coats, and is suitable for all crops, and especially corn, beans, and small grain crops. The presence of no more than one bolt-receiving bore, bore 120 in this example, through fixture 71 from trailing threshing face 90 to threshing drum emplacement side 85 proximate to the back or rear of fixture 71 and the presence of no more than one bore, bore 130 in this example, through fixture 71 from leading threshing face 91 to threshing drum emplacement side 85 proximate to the front of fixture 71 does not disable or interfere with the threshing action carried out by the respective trailing and leading threshing faces 90 and 91, according to the principle of the invention. The front-to-back, two-point coordination of nut-and-bolt assemblies 140 and 150 firmly and rigidly secure threshing bar 170 in place relative to cylindrical exterior 61 of threshing drum 60 and disables threshing bar 170 from both angularly displacing and rotating out of position relative to cylindrical exterior surface 61 of threshing drum 60 during threshing operations.

C

Figure 23:
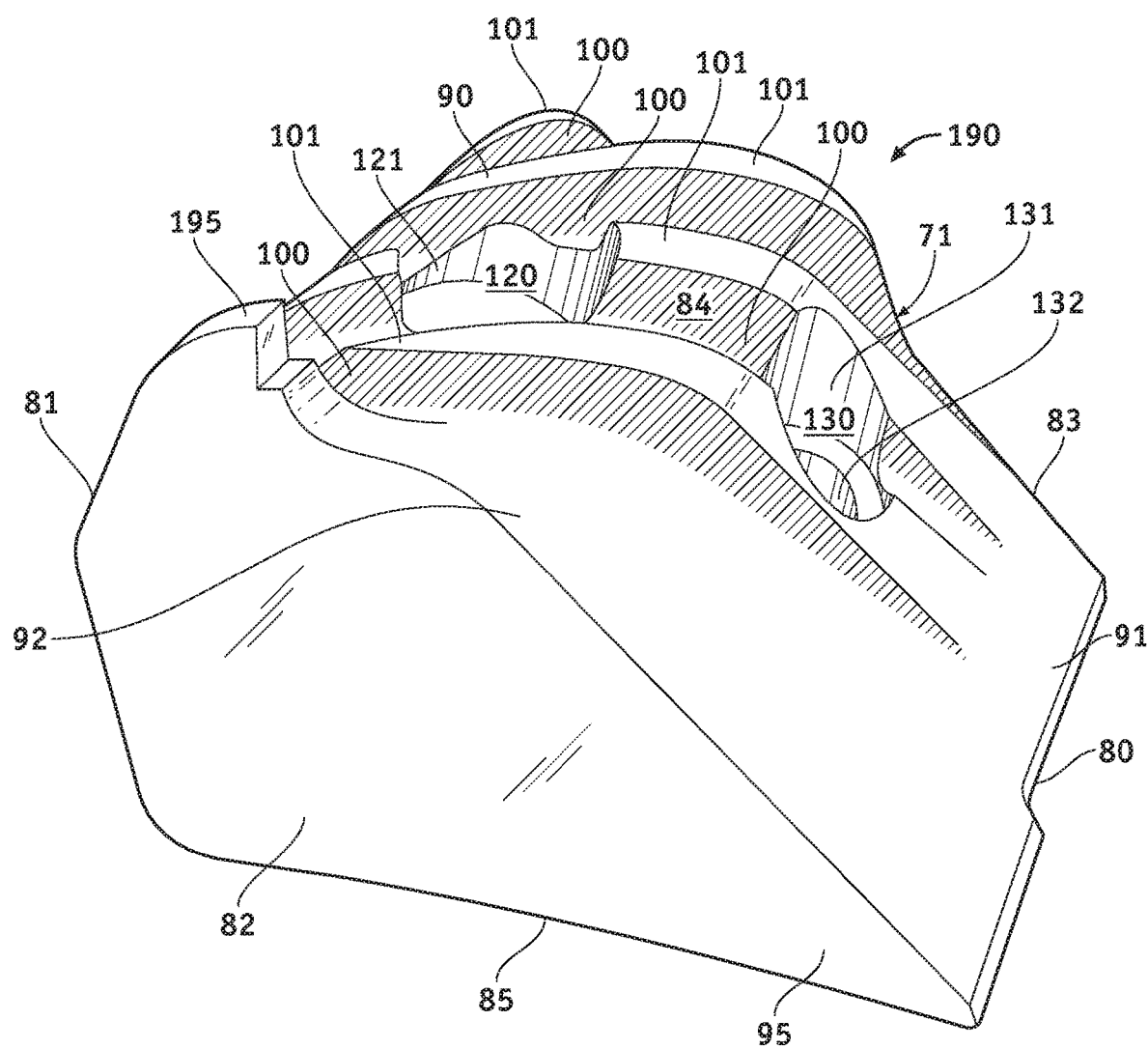
FIG. 23 is a front perspective view of yet another embodiment of a threshing bar constructed and arranged according to the invention.
Figure 24:
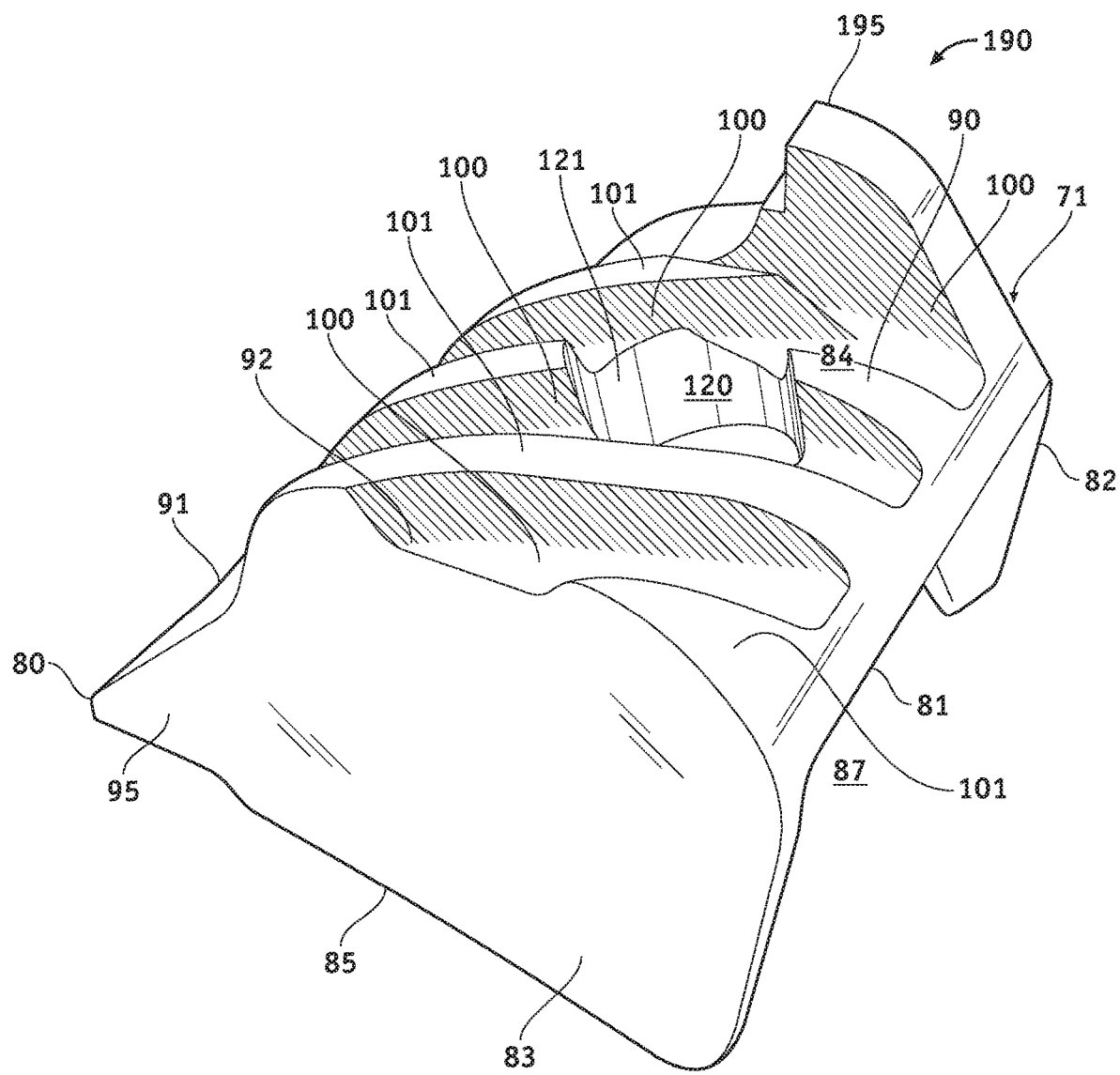
FIG. 24 is a rear perspective view of the embodiment of FIG. 23.
Figure 25:
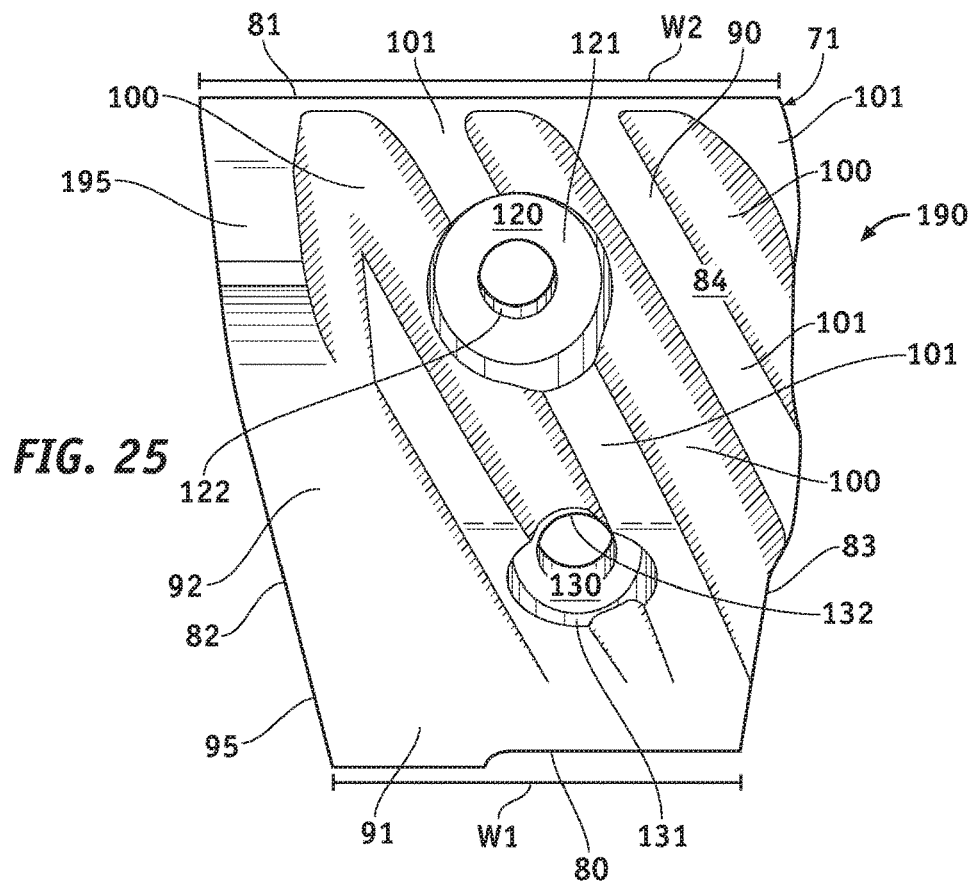
FIG. 25 is a top plan view of the embodiment of FIG. 23.
Figure 26:
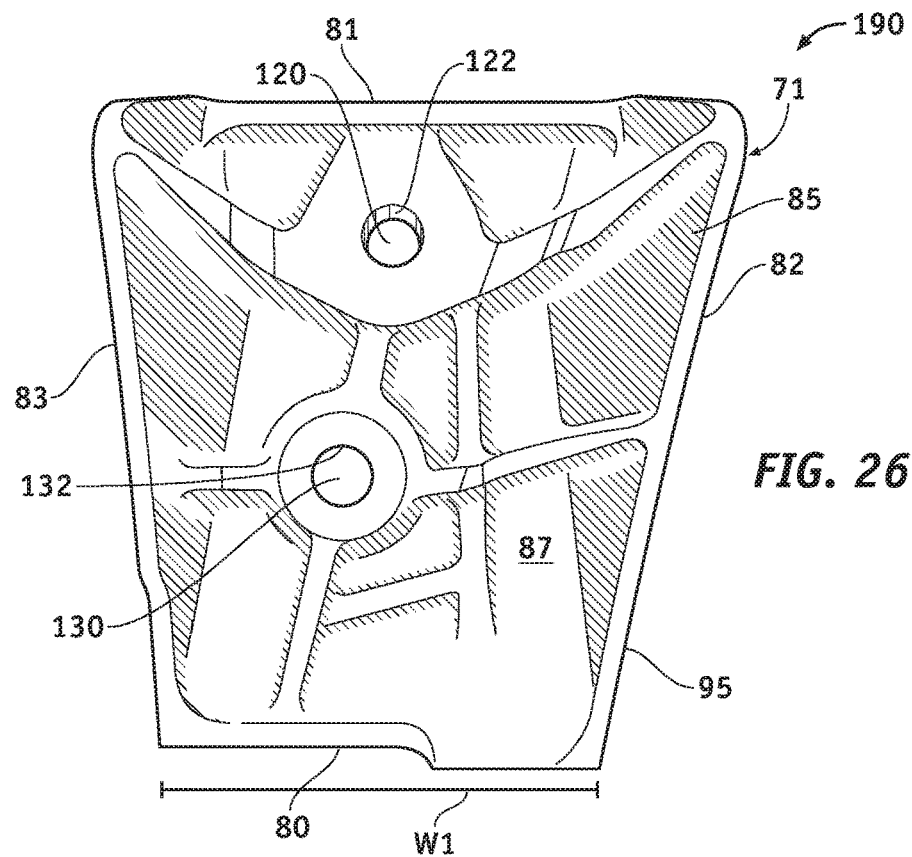
FIG. 26 is a bottom plan view of the embodiment of FIG. 23.
Figure 27:
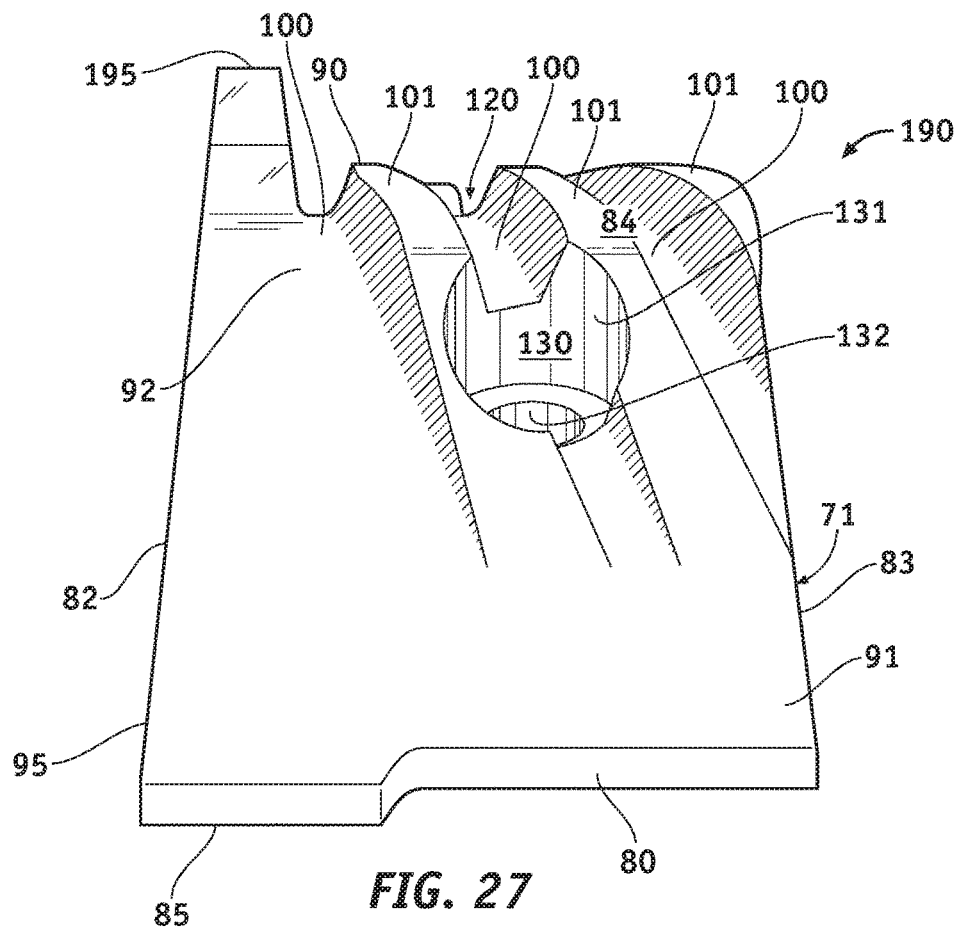
FIG. 27 is a front elevation view of the embodiment of FIG. 23.
Figure 28:
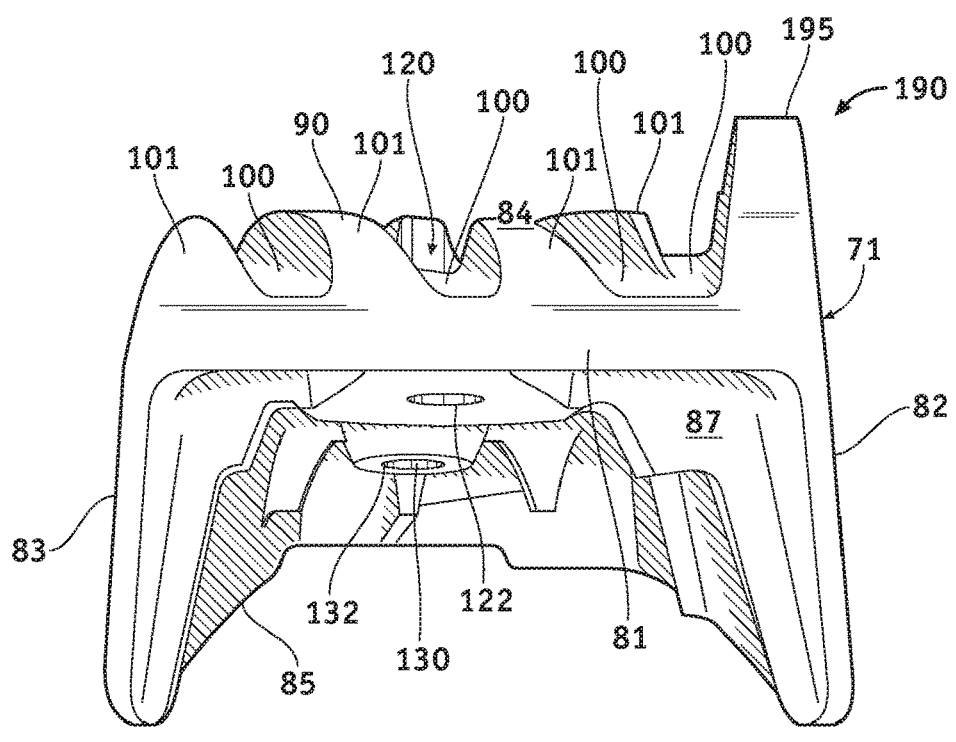
FIG. 28 is a rear elevation view of the embodiment of FIG. 23.
Figure 29:
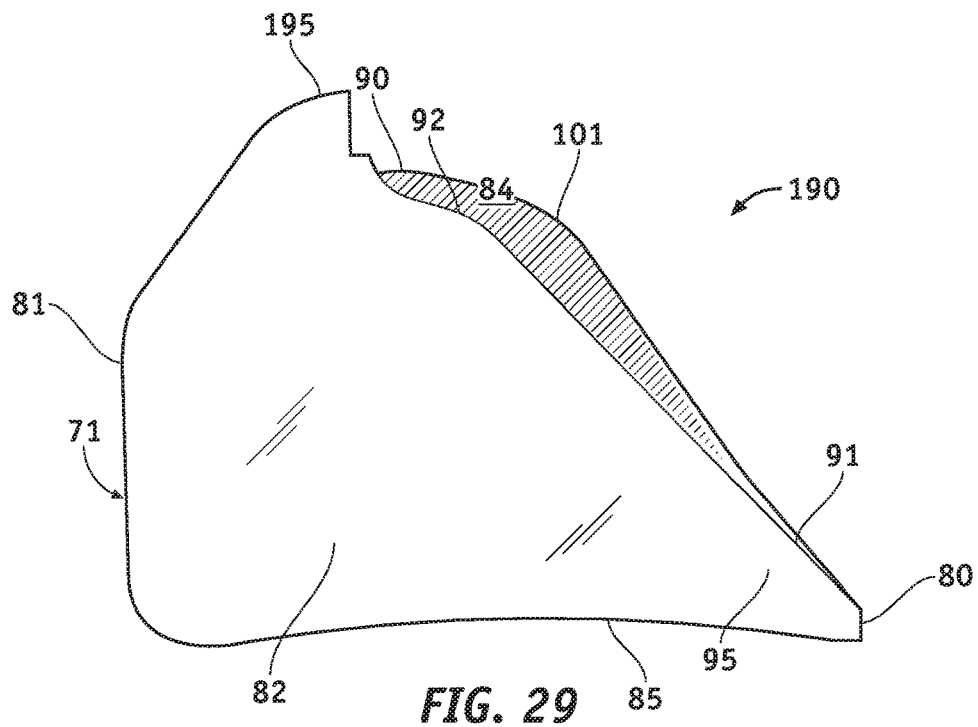
FIG. 29 is a right side elevation view of the embodiment of FIG. 23.
Figure 30:
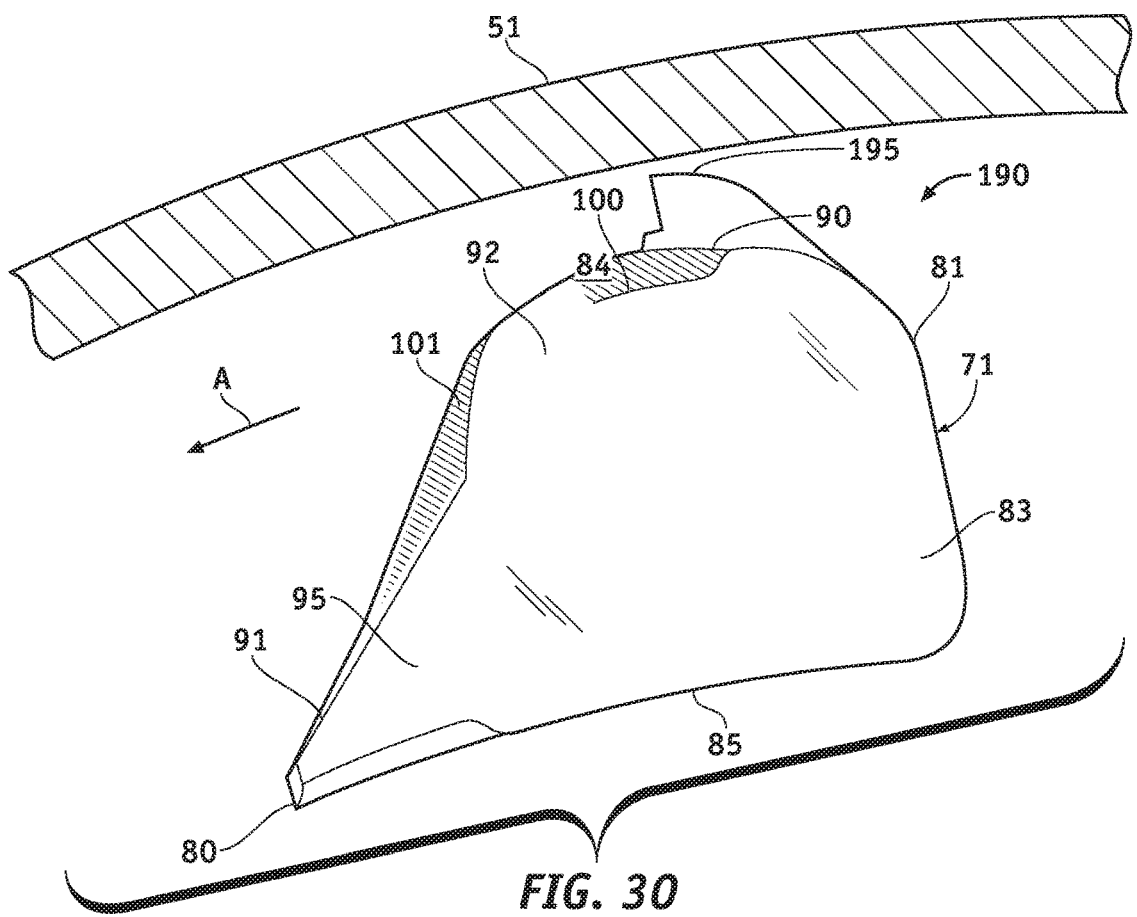
FIG. 30 is a left side elevation view of the embodiment of FIG. 23 shown as it would appear operatively positioned adjacent to a highly generalized section view of a thresher concave.

FIGS. 23-30 illustrate yet another embodiment of a threshing bar 190 constructed and arranged in accordance with the principle of the invention. FIG. 23 is a front perspective view of threshing bar 190. A population threshing bars 190 applied to cylindrical exterior 61 of threshing drum 60 together form an exemplary thresher embodiment of the invention in FIGS. 31 and 32. FIG. 24 is a rear perspective view of threshing bar 190, FIG. 25 is a top plan view of threshing bar 190, FIG. 26 is a bottom plan view of threshing bar 190, FIG. 27 is a front elevation view of threshing bar 190, FIG. 28 is a rear elevation view of threshing bar 190, FIG. 29 is a right or upstream side elevation view of threshing bar 190, and FIG. 30 is a left or downstream side elevation view of threshing bar 190 shown as it would appear operatively positioned with respect to a highly generalized section view of thresher concave 51.

Referencing FIGS. 23-30 in relevant part, threshing bar 190 is somewhat different from threshing bars 70 and 170 in overall shape, but in structure is common to threshing bars 70 and 170 in that threshing bar 190 shares fixture 71, leading edge 80 having width W1, trailing end 81 having width W2 that is greater than width W1 of leading edge 80, upstream face 82, downstream face 83, top threshing side 84, bottom threshing drum emplacement side 85, cavity 87 trailing threshing face 90, leading threshing face 91, corner 92, wedge 95, grooves 100 and vanes 101 defining the crop threshing rasp structure of top threshing side 84, bore 120 including coaxial holes 121 and 122 configured to accommodate nut-and-bolt assembly 140, and bore 130 including coaxial holes 131 and 132 configured to accommodate nut-and-bolt assembly 150.

Unlike threshing bars 70 and 170, threshing bar 190 is a spiked threshing bar in that it is formed with a spike 195 for threshing crop cuttings, specifically between corner and trailing end 81. Spike 195 is formed in threshing fixture 71. Spike 195 projects or otherwise extends outwardly from top threshing side 84 of threshing fixture 71 relative to the rasp structure formed in top threshing side 94, grooves 100 and vanes 101 in this example. More specifically, spike 195 projects or otherwise extends outwardly from trailing threshing face 90 relative to the rasp structure formed in trailing and leading faces 90 and 91 from trailing end 81 to an intermediate location between trailing end 81 and corner 92 so as to be available for threshing crop cuttings between upstream and trailing ends 80 and 81 and, more particularly, between trailing end 81 and corner 92. Spike 195 is formed at and along end face 82 of threshing fixture 71.

Bore 120 proximate to the back or rear of fixture 71 extends through fixture 71 from trailing threshing face 90 to threshing drum emplacement side 85, and is located at an intermediate position between end faces 82 and 83 and an intermediate position between trailing end 81 and corner 92. As with the previous embodiments, no more than one bore, bore 120 in this example, extends through fixture 71 from trailing threshing face 90 to threshing drum emplacement side 85 so as to not to disable or interfere with the threshing action carried out by trailing threshing face 90 of top threshing side 84.

Bore 130 proximate to the front of fixture 71 extends through fixture 71 from leading threshing face 91 to threshing drum emplacement side 85, and is located at an intermediate position between end faces 82 and 83 and an intermediate position between leading edge 80 and corner 92. As with the previous embodiments, no more than one bore, bore 130 in this example, extends through fixture 71 from leading threshing face 91 to threshing drum emplacement side 85 so as to not to disable or interfere with the threshing action carried out by leading threshing face 91 of top threshing side 84.

Bores 120 and 130 are arranged in the front-to-back direction from bore 130 between leading edge 80 and corner 92 to bore 120 between corner 92 and trailing end 81. Accordingly, when nut-and-bolt assemblies 140 and 150 are applied to the respective bores 120 and 130, nut-and-bolt assemblies 140 and 150 are concurrently arranged in the front-to-back direction from nut-and-bolt assembly 140 applied to bore 130 between leading edge 80 and corner 92 to nut-and-bolt assembly 150 applied to bore 120 between corner 92 and trailing end 81.

Figure 33:
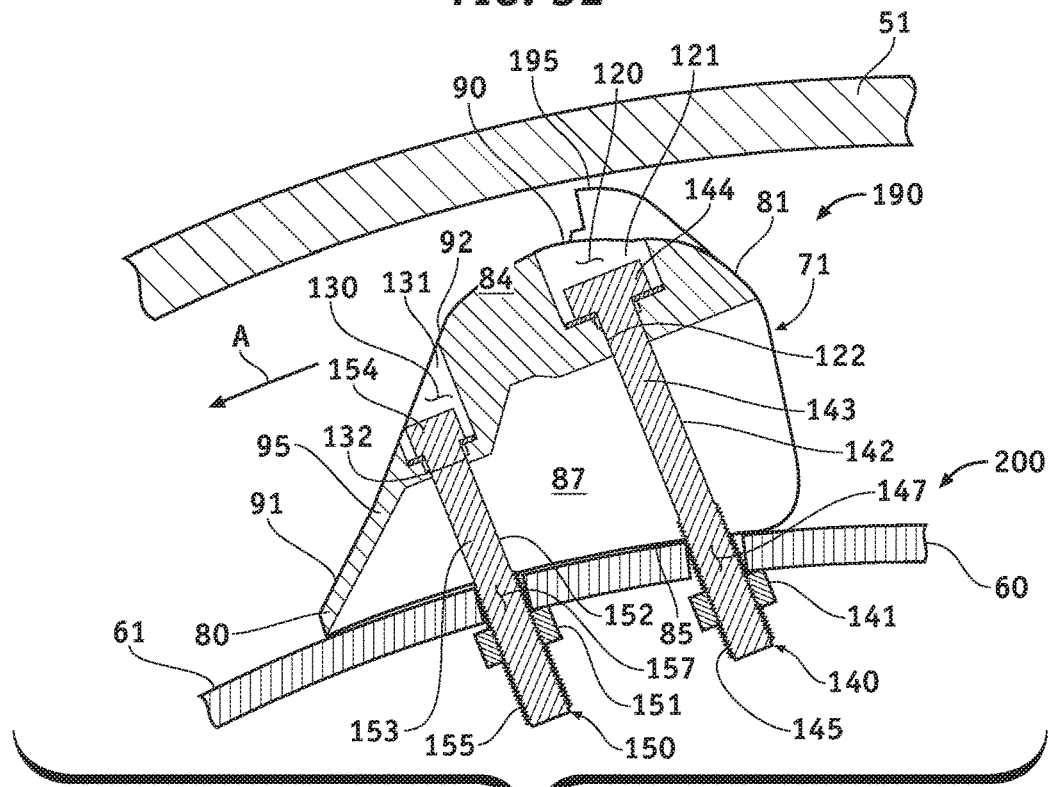
FIG. 33 is a section view taken along line 33-33 of FIG. 32.

In the installation of threshing bar 190 in FIG. 33, bottom threshing drum emplacement side 85 of threshing bar 190 is set onto cylindrical exterior 61 of threshing drum 60, threshing side 84 of threshing bar 190 and the rasp structure formed therein faces outwardly toward and confronts thresher concave 51, and spike 195 extends outwardly beyond the rasp structure toward thresher concave 51 and faces into the threshing direction of threshing drum indicated by arrow A. Threshing bar 190 is positioned so as to direct leading edge 80 and leading threshing face 91 into the threshing direction of rotation of threshing drum 60 indicated by arrow A, so as to direct end face 82 toward the upstream end or location 50A of threshing drum 60 in FIG. 31, and so as to direct end face 83 toward the downstream end or location of threshing drum 60 in FIG. 31, whereby threshing bar 190 leads with leading edge 80 and trails with trailing end 81 and a crop applied between cylindrical exterior 61 of threshing drum 60 and thresher concave 51 is threshed by and between thresher concave 51 and top threshing side 84 of threshing bar 190 and spike 195 in response to rotation of threshing drum 60 in the threshing direction of rotation. Spike 195 is especially useful for spike-threshing crops, such as rice and other crops having inherently tough straw. Bottom threshing drum emplacement side 85 of threshing bar 190 is contoured to be received by cylindrical exterior 61 of threshing drum 60.

In the installation of nut-and-bolt assembly 140 as shown in FIG. 33, head 144 is set into and is received by hole 121, a counterbore, such that it is located under trailing threshing face 90 of top threshing side 84 so as not to disable or interfere with the threshing action carried out by trailing threshing face 90 of top threshing side 84. Shank 143 extends downwardly through hole 122 from head 144 fitted in hole 121 and into and through cavity 87 and away from bottom threshing drum emplacement side 85 to threaded connecting end 145, which is applied through an opening 147 formed through threshing drum 60. Nut 141 is threaded onto threaded connecting end 145 of shank 143 along the underside of threshing drum 60 and is tightened to firmly and rigidly secure threshing bar 190 in place relative to cylindrical exterior 61 of threshing drum 60 between head 144 and nut 141.

In the installation of nut-and-bolt assembly 150 as shown in FIG. 33, head 154 is set into and is received by hole 131, a counterbore, such that it is located under leading threshing face 91 of top threshing side 84 so as not to disable or interfere with the threshing action carried out by leading threshing face 91 of top threshing side 84. Shank 153 extends downwardly through hole 132 from head 154 fitted in hole 121 and into and through cavity 87 and away from bottom threshing drum emplacement side 85 to threaded connecting end 155, which is applied through an opening 157 formed through threshing drum 60. Nut 151 is threaded onto threaded connecting end 155 of shank 153 along the underside of threshing drum 60 and is tightened to firmly and rigidly secure threshing bar 190 in place relative to cylindrical exterior 61 of threshing drum 60 between head 154 and nut 151.

When threshing bar 190 is secured to threshing drum 60 at the two connection points by the two corresponding nut-and-bolt assemblies 140 and 150 applied to the respective bores 120 and 130 and secured to threshing drum 60 as described above, nut-and-bolt assemblies 140 and 150 cooperate or otherwise work in the previously described front-to-back, two-point coordination with one another from nut-and-bolt assembly 150 applied to bore 130 adjacent to the front of fixture 71 at leading threshing face 91 between leading edge 80 and corner 92 to nut-and-bolt assembly 140 applied to bore 120 adjacent to the back of fixture 71 at trailing threshing face 90 between corner 92 and trailing end 81. This front-to-back, two-point coordination of nut-and-bolt assemblies 140 and 150 firmly and rigidly secures threshing bar 190 in place relative to cylindrical exterior 61 of threshing drum 60 and at the same time concurrently disables threshing bar 190 from both angularly displacing and rotating relative to cylindrical exterior surface 61 of threshing drum 60, according to the principle of the invention. While the front-to-back direction of orientation of bores 120 and 130 enables a corresponding front-to-back direction of orientation of nut-and-bolt assemblies 140 and 150 as described herein, the presence of no more than one bolt-receiving bore, bore 120 in this example, through fixture 71 from trailing threshing face 90 to threshing drum emplacement side 85 proximate to the rear or back of fixture 71 and the presence of no more than one bore, bore 130 in this example, through fixture 71 from leading threshing face 91 to threshing drum emplacement side 85 proximate to the front of fixture 71 does not disable or interfere with the threshing action carried out by the respective trailing and leading threshing faces 90 and 91, according to the principle of the invention.

Figure 31:
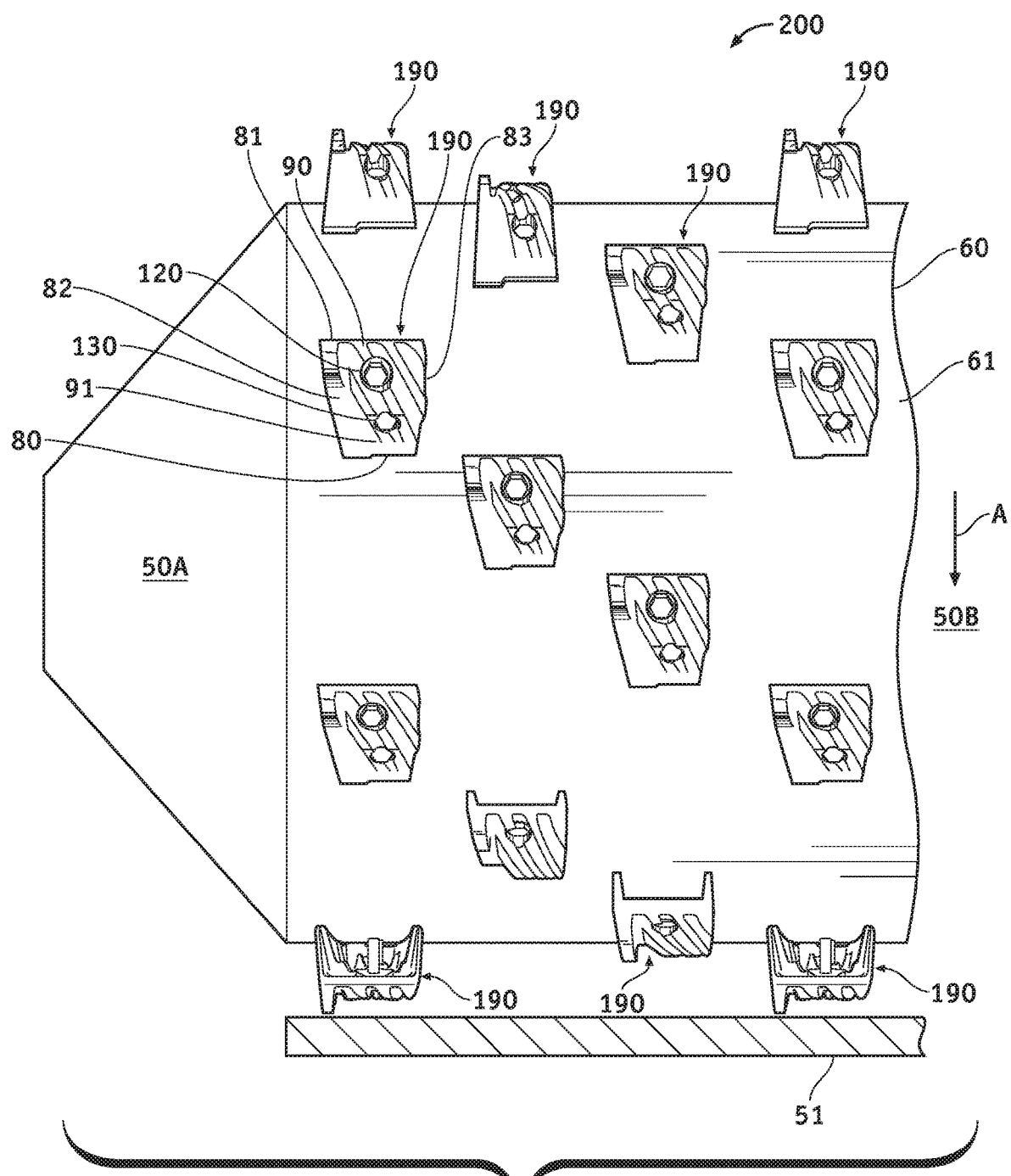
FIG. 31 is a fragmented, front elevation view of a thresher, including a threshing drum formed with threshing bars each according to the embodiment of FIG. 23, operatively positioned adjacent to a highly generalized section view of a thresher concave.
Figure 32:
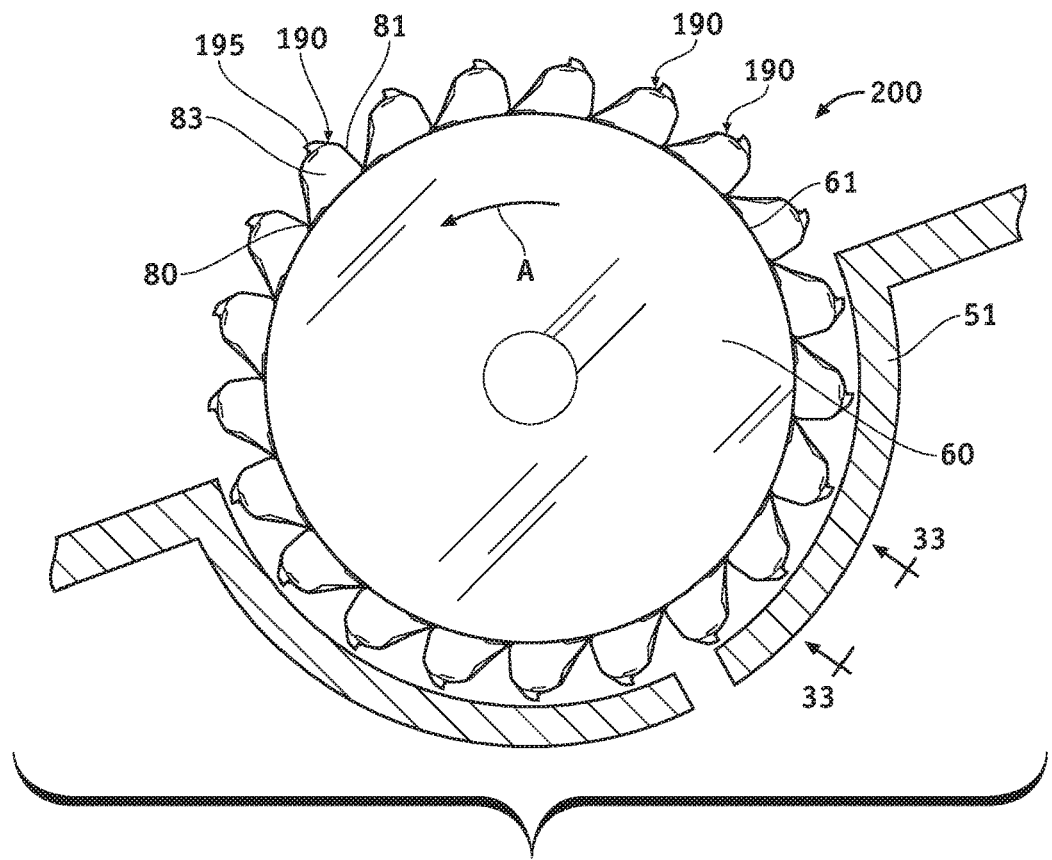
FIG. 32 is an enlarged, highly generalized side elevation view of the thresher and section view of the thresher concave of FIG. 31.

A population of threshing bars 190 is emplaced and affixed to cylindrical exterior of threshing drum 60, as generally depicted in FIGS. 31 and 32, to form an exemplary thresher 200 according to the principle of the invention. In FIG. 31, threshing bars are denoted at 190, and are shown set onto cylindrical exterior 61 of threshing drum 60 in preparation for threshing. Threshing bars 190 are positioned with their leading edges 80 and leading threshing faces 91 facing or otherwise directed into the threshing direction of rotation of threshing drum 60 indicated by arrow A so as to direct their end faces 82 toward the upstream location 50A of threshing drum 60, and so as to direct their end faces 83 toward the downstream location 50B of threshing drum 60. The crop material deflecting surfaces of threshing bars 190, end faces 82, face upstream location 50A of threshing drum 60, and are oblique relative to and angled toward both upstream location 50A of threshing drum the threshing direction of rotation of threshing drum 60 as indicated by arrow A. In response to rotation of threshing drum 60 in the threshing direction of rotation denoted by arrow A, threshing bars 190 lead with their leading edges 80 and trail with their trailing ends 81 and crop cuttings applied between cylindrical exterior 61 of threshing drum 60 and thresher concave 51 are threshed by and between the rasp structures and spikes formed in the top threshing sides 84 of threshing bars 190 and thresher concave 51 separating the grains from the chaff to form threshings, namely, the chaff and the separated grains. In the customary operation of the combine harvester, the grains fall through sieves into the collection tank inside the combine harvester.

In FIGS. 31, 32, and 33, as each threshing bar 190 is rotated by threshing drum 60 along the threshing direction of rotation over the crop cuttings received between top threshing side 84 of threshing bar 190 and thresher concave 51, the crop cuttings encounter top threshing side 84 from leading edge 80 to trailing end 81 and impact leading threshing face 91 and impact and encounter the rasp structure consisting of grooves 100 and corresponding vanes 101 applied along leading threshing face 91 and trailing threshing face 90 and spike 195 formed along trailing threshing face 90 imparting a threshing action against the crop cuttings to form threshings. The incline of leading threshing face 91 relative to trailing threshing face 90, and the grooves 100 and corresponding vanes 101 forming the rasp structure along leading threshing face 91 and trailing threshing face 90 cooperate to cause threshing bar 190 to perform an aggressive threshing of the crop cuttings to be threshed. Leading threshing face 91 faces upwardly toward thresher concave 51 and faces into the threshing direction of rotation of threshing drum 60 indicated by arrow A and inclines downwardly from trailing threshing face 90 to cylindrical exterior 61 of threshing drum 60 at an average downward incline of 40 degrees relative to trailing threshing face 90, and in response to rotation of threshing drum 60 in the threshing direction of rotation crop cuttings initially impact leading threshing face 91 at a steep and oblique impaction angle of 50-60 degrees and the defined incline of leading threshing face 91 as previously described thus provides an aggressive initial impaction against the crop cuttings in the threshing of such crop cuttings but not so aggressive so as to cause an initial over-threshing of the crop cuttings. The crop cuttings and threshings are forced along the vanes 101 and into and through the grooves 100 defining the crop material conveyance pathways of the rasp structure of threshing fixture 71 in a rearward direction from leading edge 80 to trailing end 81 and further in an angled direction from end face 83 of fixture 71 to trailing end 81 of fixture 71 and are thrust outwardly therefrom toward upstream location 50A of threshing drum 60 and away from end face 82, in response to movement of threshing bar 190 along the threshing direction of rotation of threshing drum 60 leading with leading edge 80. This thrusting of crop cuttings and threshings along and through the crop material conveyance pathways defined by the rasp structure of threshing fixture 71 toward upstream location 50A of threshing drum 60 slows the conveyance of this material along thresher 50 from upstream location 50A to downstream location 50B thereby prolonging the applied threshing action to the crop cuttings to provide a thorough, repeated, more prolonged, and aggressive threshing of the crop cuttings to be threshed as thresher 50 rotates. And so the rasp structure formed by grooves 100 and corresponding vanes 101 creates contact of the crop cuttings against the concave allowing more crop cuttings to rub together, the rasp structure is aggressive and yet gentle on the crop cuttings to allow the crop cuttings to be managed through and along the crop material conveyance pathways formed by grooves 100 and corresponding vanes 101, and spike 195 serves as an aggressive threshing implement configured to cut and break up crops having inherently tough straw.

The presence of no more than one bolt-receiving bore, bore 120 in this example, through fixture 71 from trailing threshing face 90 to threshing drum emplacement side 85 proximate to the back or rear of fixture 71 and the presence of no more than one bore, bore 130 in this example, through fixture 71 from leading threshing face 91 to threshing drum emplacement side 85 proximate to the front of fixture 71 does not disable or interfere with the threshing action carried out by the respective trailing and leading threshing faces 90 and 91, according to the principle of the invention. The front-to-back, two-point coordination of nut-and-bolt assemblies 140 and 150 firmly and rigidly secure threshing bar 190 in place relative to cylindrical exterior 61 of threshing drum 60 and disables threshing bar 190 from both angularly displacing and rotating out of position relative to cylindrical exterior surface 61 of threshing drum 60 during threshing operations.

D

Figure 34:
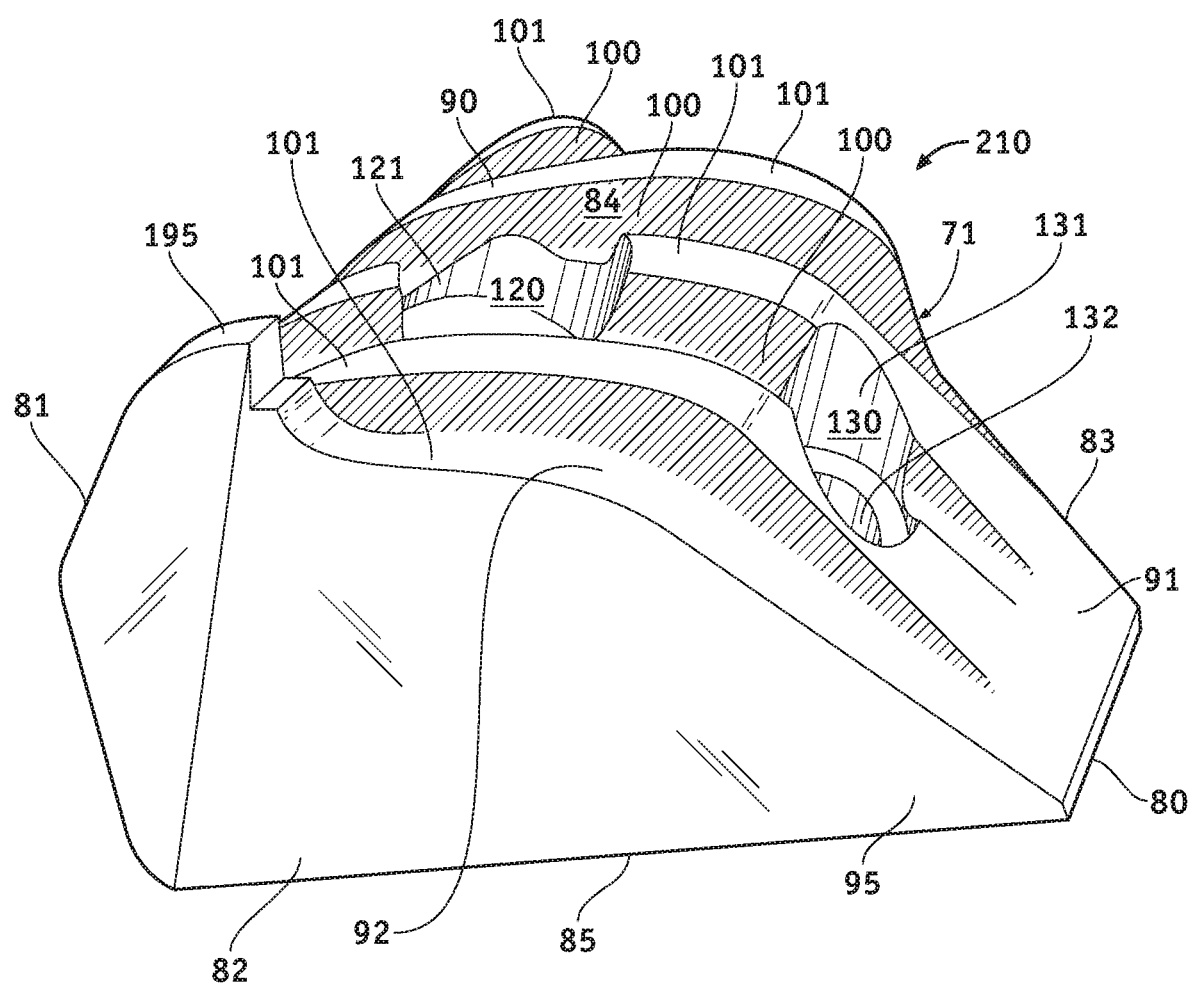
FIG. 34 is a front perspective view of yet still another embodiment of a threshing bar constructed and arranged according to the invention.
Figure 35:
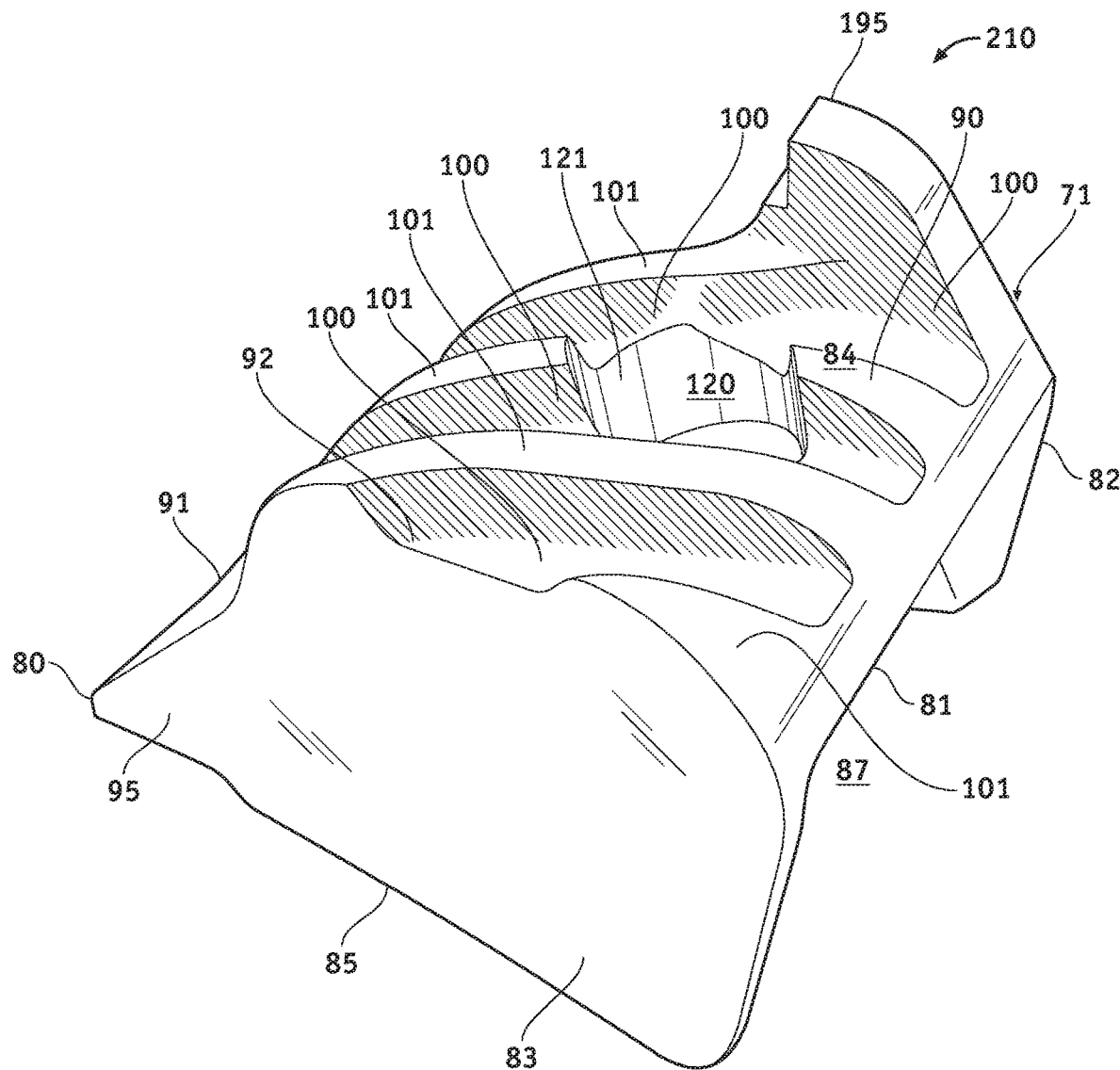
FIG. 35 is a rear perspective view of the embodiment of FIG. 34.
Figure 36:
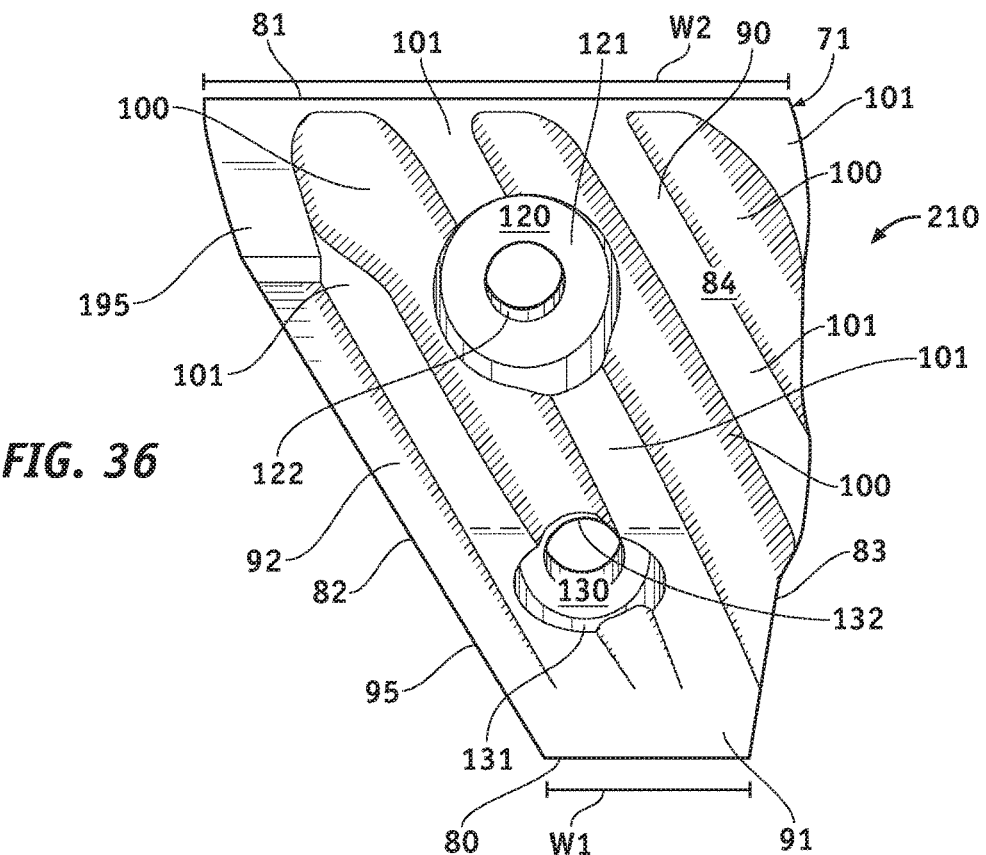
FIG. 36 is a top plan view of the embodiment of FIG. 34.
Figure 37:
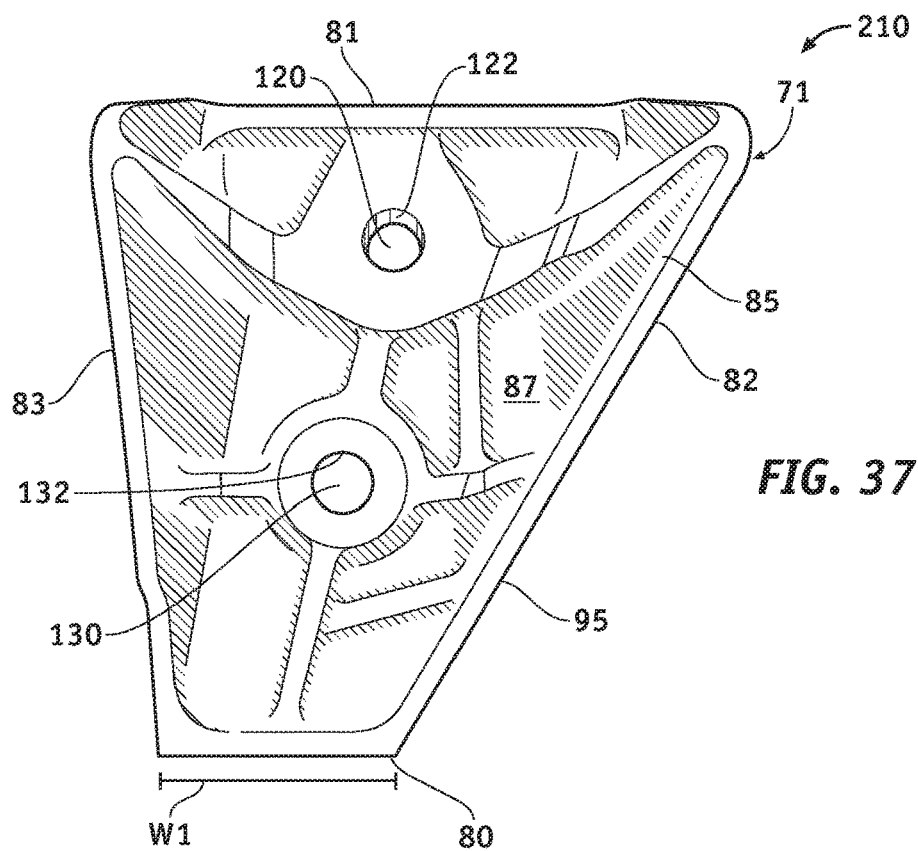
FIG. 37 is a bottom plan view of the embodiment of FIG. 34.
Figure 38:
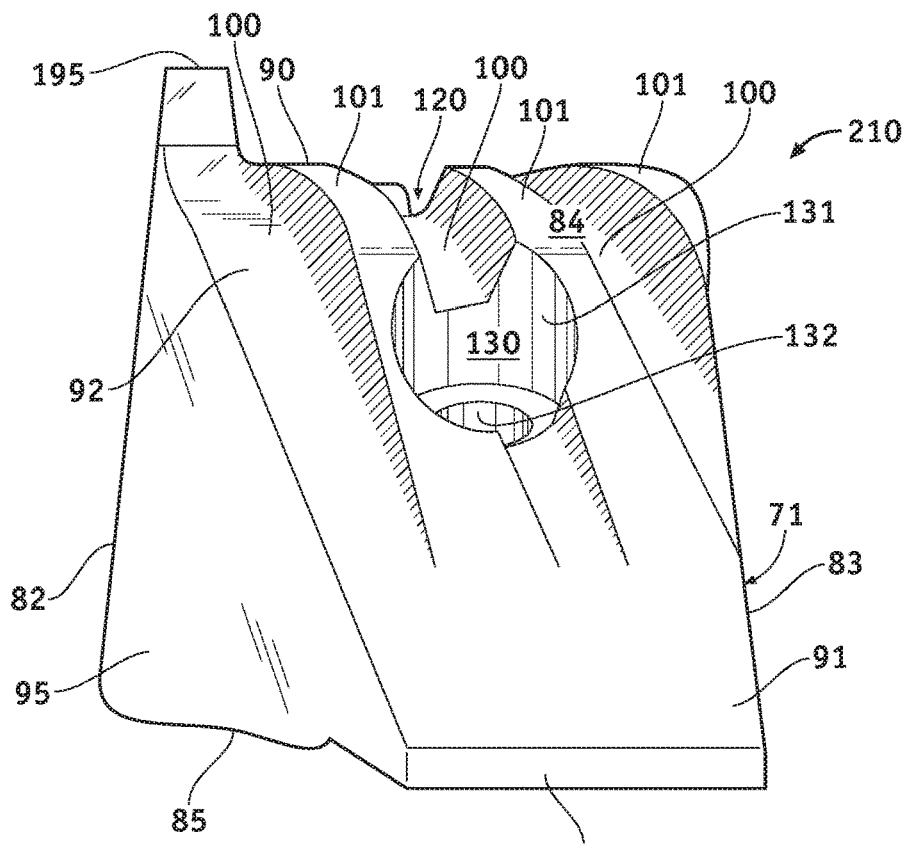
FIG. 38 is a front elevation view of the embodiment of FIG. 34.
Figure 39:
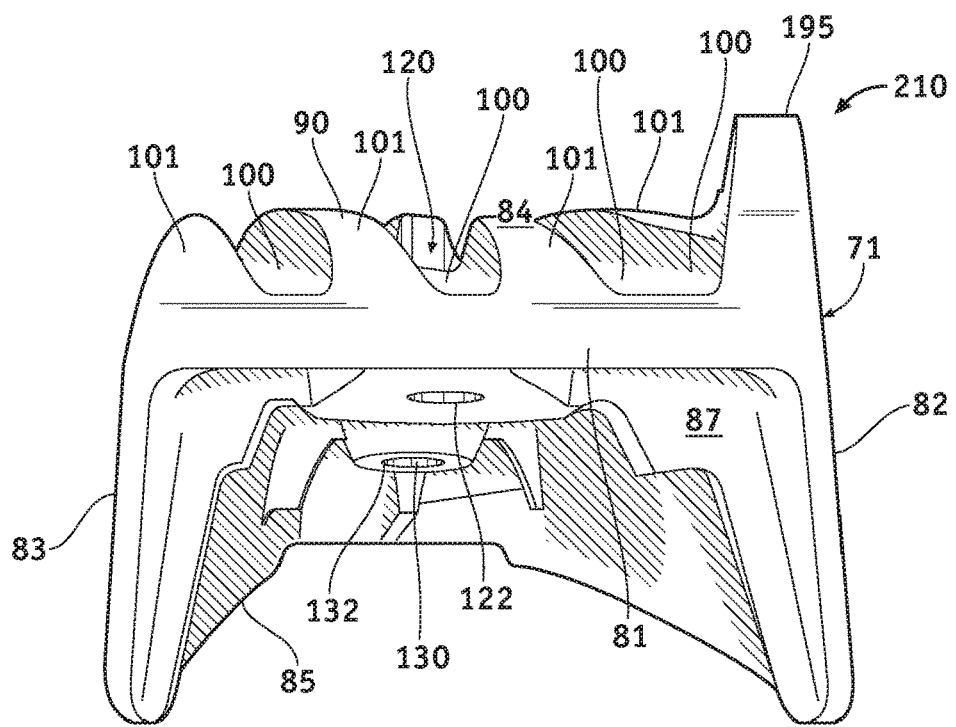
FIG. 39 is a rear elevation view of the embodiment of FIG. 34.
Figure 40:
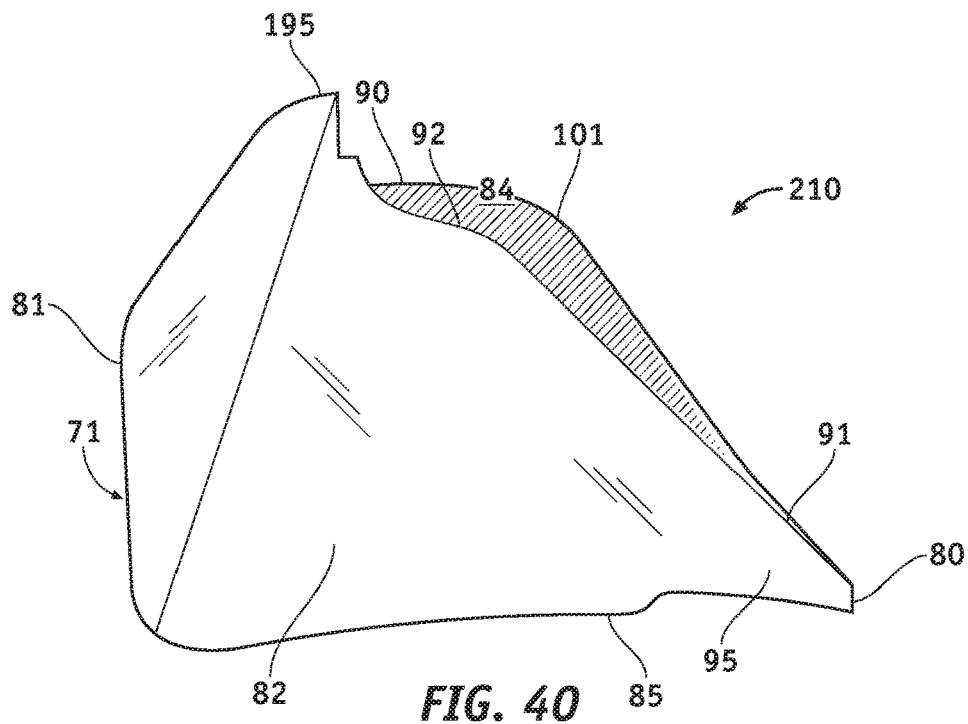
FIG. 40 is a right side elevation view of the embodiment of FIG. 34.
Figure 41:
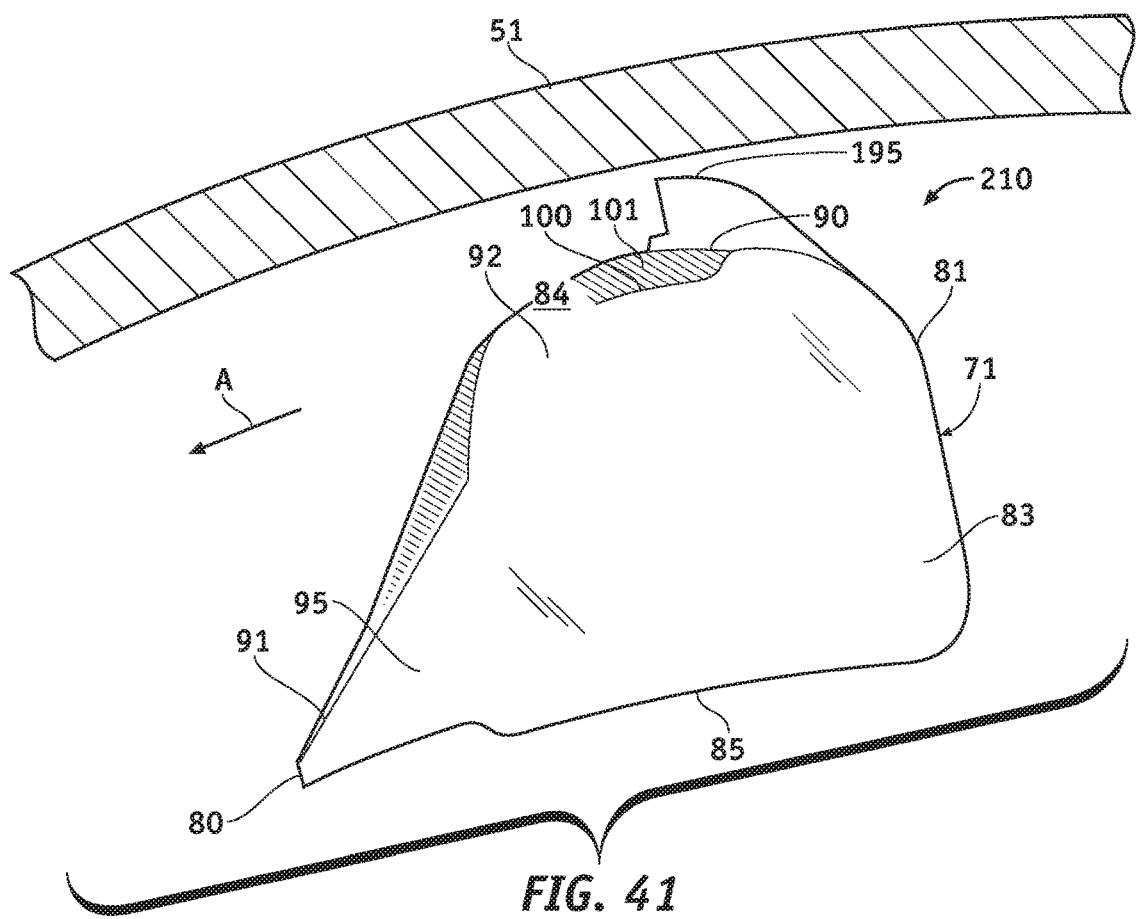
FIG. 41 is a left side elevation view of the embodiment of FIG. 34 shown as it would appear operatively positioned adjacent to a highly generalized section view of a thresher concave.
Figure 42:
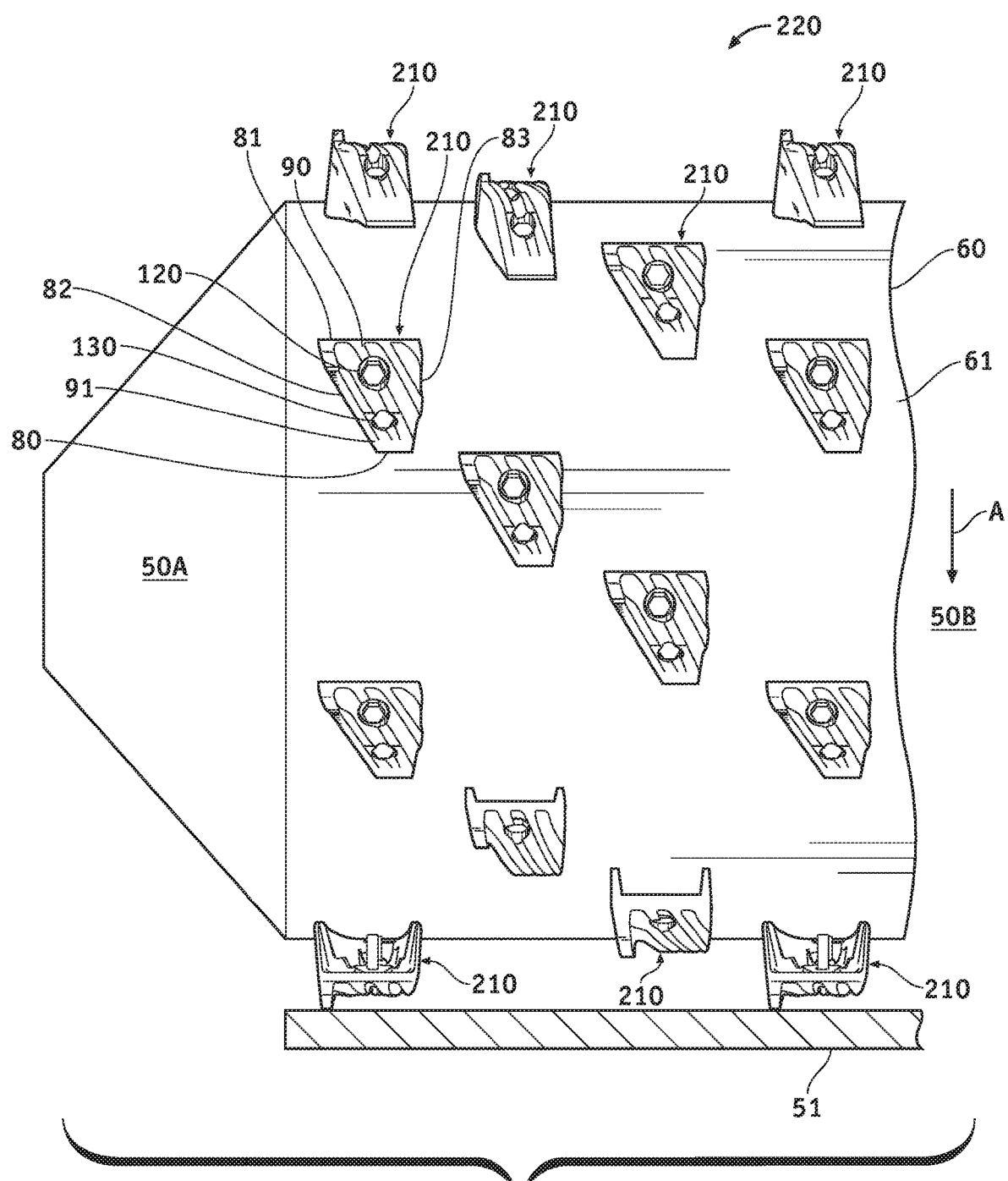
FIG. 42 is a fragmented, front elevation view of a thresher, including a threshing drum formed with threshing bars each according to the embodiment of FIG. 34, operatively positioned adjacent to a highly generalized section view of a thresher concave.
Figure 43:
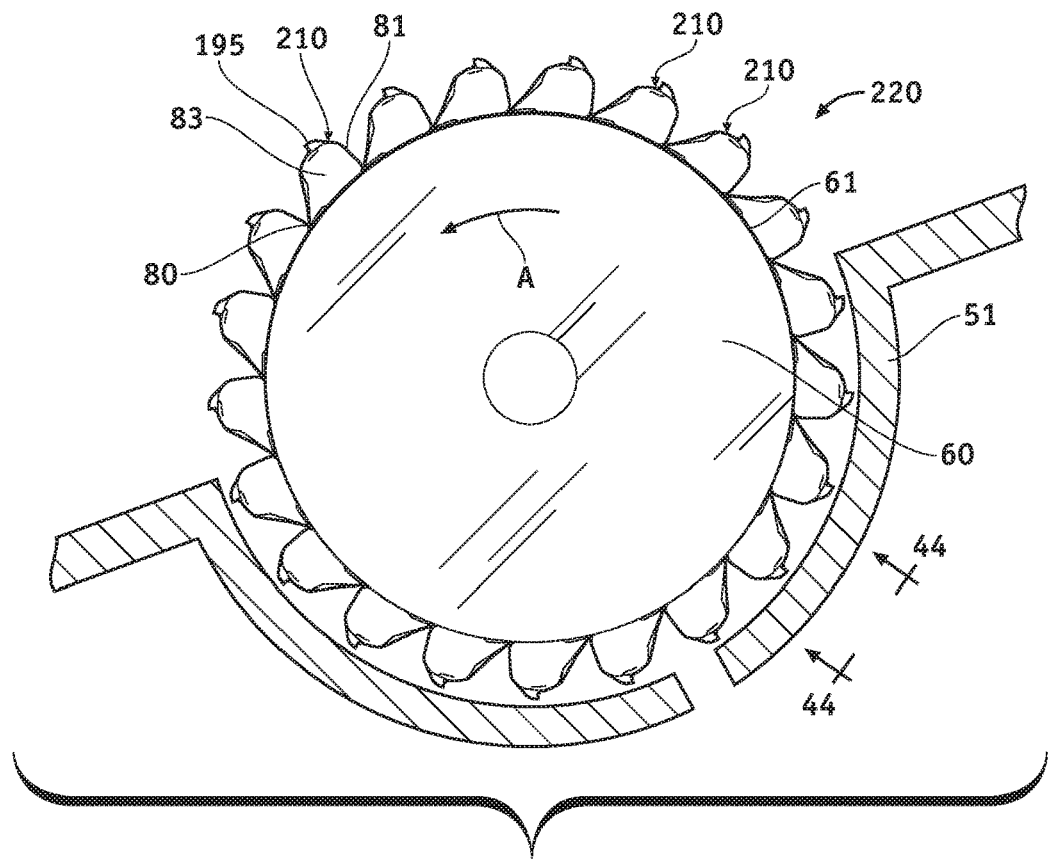
FIG. 43 is an enlarged, highly generalized side elevation view of the thresher and section view of the thresher concave of FIGS. 42.
Figure 44:
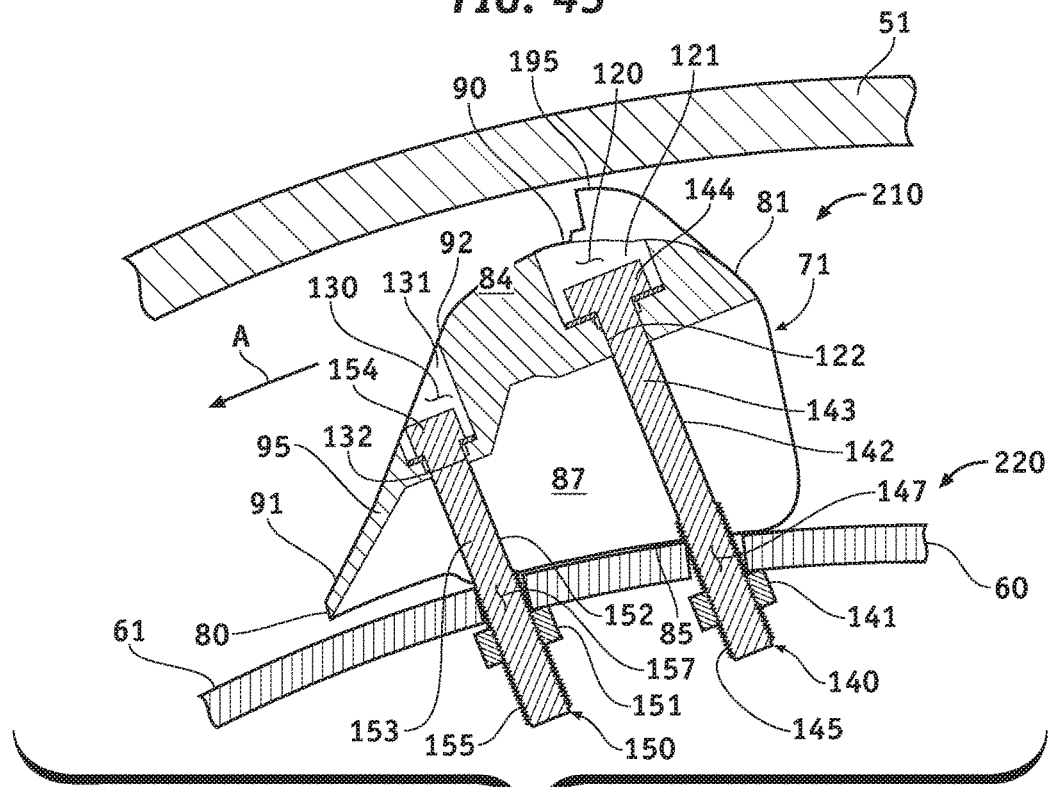
FIG. 44 is a section view taken along line 44-44 of FIG. 43.

FIGS. 34-44 illustrate yet another embodiment of a threshing bar 210 constructed and arranged in accordance with the principle of the invention. FIG. 34 is a front perspective view of threshing bar 210. A population threshing bars 210 applied to cylindrical exterior 61 of threshing drum 60 together form an exemplary thresher embodiment of the invention in FIGS. 42 and 43. FIG. 35 is a rear perspective view of threshing bar 210, FIG. 36 is a top plan view of threshing bar 210, FIG. 37 is a bottom plan view of threshing bar 210, FIG. 38 is a front elevation view of threshing bar 210, FIG. 39 is a rear elevation view of threshing bar 210, FIG. 40 is a right or upstream side elevation view of threshing bar 210, and FIG. 41 is a left or downstream side elevation view of threshing bar 210 shown as it would appear operatively positioned with respect to a highly generalized section view of thresher concave 51.

Referencing FIGS. 34-41 in relevant part, threshing bar 210 is smaller somewhat different from threshing bar 190 in overall shape, but in structure is common to threshing bar 190 in that threshing bar 210 shares fixture 71, leading edge 80 having width W1, trailing end 81 having width W2 that is greater than width W1 of leading edge 80, upstream face 82, downstream face 83, top threshing side 84, bottom threshing drum emplacement side 85, cavity 87 trailing threshing face 90, leading threshing face 91, corner 92, wedge 95, grooves 100 and vanes 101 defining the crop threshing rasp structure of top threshing side 84, bore 120 including coaxial holes 121 and 122 configured to accommodate nut-and-bolt assembly 140, bore 130 including coaxial holes 131 and 132 configured to accommodate nut-and-bolt assembly 150, and spike 195. Since threshing bar 210 is smaller and somewhat different from threshing bar 190 in overall shape, the crop-threshing characteristics of threshing bar 210 are less aggressive compared to threshing bar 190.

Bore 120 extends through fixture 71 from trailing threshing face 90 to threshing drum emplacement side 85, and is located at an intermediate position between end faces 82 and 83 and an intermediate position between trailing end 81 and corner 92. No more than one bore, bore 120 in this example, extends through fixture 71 from trailing threshing face 90 to threshing drum emplacement side 85 so as to not to disable or interfere with the threshing action carried out by trailing threshing face 90 of top threshing side 84.

Bore 130 extends through fixture 71 from leading threshing face 91 to threshing drum emplacement side 85, and is located at an intermediate position between end faces 82 and 83 and an intermediate position between leading edge 80 and corner 92. No more than one bore, bore 130 in this example, extends through fixture 71 from leading threshing face 91 to threshing drum emplacement side 85 so as to not to disable or interfere with the threshing action carried out by leading threshing face 91 of top threshing side 84.

Bores 120 and 130 are arranged in the front-to-back direction from bore 130 between leading edge 80 and corner 92 to bore 120 between corner 92 and trailing end 81. Accordingly, when nut-and-bolt assemblies 140 and 150 are applied to the respective bores 120 and 130, nut-and-bolt assemblies 140 and 150 are concurrently arranged in the front-to-back direction from nut-and-bolt assembly 140 applied to bore 130 between leading edge 80 and corner 92 to nut-and-bolt assembly 150 applied to bore 120 between corner 92 and trailing end 81.

In the installation of threshing bar 210 in FIG. 33, bottom threshing drum emplacement side 85 of threshing bar 210 is set onto cylindrical exterior 61 of threshing drum 60, threshing side 84 of threshing bar 210 and the rasp structure formed therein faces outwardly toward and confronts thresher concave 51, and spike 195 extends outwardly beyond the rasp structure toward thresher concave 51 and faces into the threshing direction of threshing drum indicated by arrow A. Threshing bar 210 is positioned so as to direct leading edge 80 and leading threshing face 91 into the threshing direction of rotation of threshing drum 60 indicated by arrow A, so as to direct end face 82 toward the upstream end or location 50A of threshing drum 60 in FIG. 31, and so as to direct end face 83 toward the downstream end or location of threshing drum 60 in FIG. 31, whereby threshing bar 210 leads with leading edge 80 and trails with trailing end 81 and a crop applied between cylindrical exterior 61 of threshing drum 60 and thresher concave 51 is threshed by and between thresher concave 51 and top threshing side 84 of threshing bar 210 and spike 195 in response to rotation of threshing drum 60 in the threshing direction of rotation. Spike 195 is especially useful for spike-threshing crops, such as rice and other crops having inherently tough straw. Bottom threshing drum emplacement side 85 of threshing bar 210 is contoured to be received by cylindrical exterior 61 of threshing drum 60.

In the installation of nut-and-bolt assembly 140 as shown in FIG. 33, head 144 is set into and is received by hole 121, a counterbore, such that it is located under trailing threshing face 90 of top threshing side 84 so as not to disable or interfere with the threshing action carried out by trailing threshing face 90 of top threshing side 84. Shank 143 extends downwardly through hole 122 from head 144 fitted in hole 121 and into and through cavity 87 and away from bottom threshing drum emplacement side 85 to threaded connecting end 145, which is applied through an opening 147 formed through threshing drum 60. Nut 141 is threaded onto threaded connecting end 145 of shank 143 along the underside of threshing drum 60 and is tightened to firmly and rigidly secure threshing bar 210 in place relative to cylindrical exterior 61 of threshing drum 60 between head 144 and nut 141.

In the installation of nut-and-bolt assembly 150 as shown in FIG. 33, head 154 is set into and is received by hole 131, a counterbore, such that it is located under leading threshing face 91 of top threshing side 84 so as not to disable or interfere with the threshing action carried out by leading threshing face 91 of top threshing side 84. Shank 153 extends downwardly through hole 132 from head 154 fitted in hole 121 and into and through cavity 87 and away from bottom threshing drum emplacement side 85 to threaded connecting end 155, which is applied through an opening 157 formed through threshing drum 60. Nut 151 is threaded onto threaded connecting end 155 of shank 153 along the underside of threshing drum 60 and is tightened to firmly and rigidly secure threshing bar 210 in place relative to cylindrical exterior 61 of threshing drum 60 between head 154 and nut 151.

When threshing bar 210 is secured to threshing drum 60 at the two connection points by the two corresponding nut-and-bolt assemblies 140 and 150 applied to the respective bores 120 and 130 and secured to threshing drum 60 as described above, nut-and-bolt assemblies 140 and 150 cooperate or otherwise work in the previously described front-to-back, two-point coordination with one another from nut-and-bolt assembly 150 applied to bore 130 at leading threshing face 91 between leading edge 80 and corner 92 to nut-and-bolt assembly 140 applied to bore 120 at trailing threshing face 90 between corner 92 and trailing end 81. This front-to-back, two-point coordination of nut-and-bolt assemblies 140 and 150 firmly and rigidly secures threshing bar 210 in place relative to cylindrical exterior 61 of threshing drum 60 and at the same time concurrently disables threshing bar 210 from both angularly displacing and rotating relative to cylindrical exterior surface 61 of threshing drum 60, according to the principle of the invention. While the front-to-back direction of orientation of bores 120 and 130 enables a corresponding front-to-back direction of orientation of nut-and-bolt assemblies 140 and 150 as described herein, the presence of no more than one bolt-receiving bore, bore 120 in this example, through fixture 71 from trailing threshing face 90 to threshing drum emplacement side 85 proximate to the rear or back of fixture 71 and the presence of no more than one bore, bore 130 in this example, through fixture 71 from leading threshing face 91 to threshing drum emplacement side 85 proximate to the front of fixture 71 does not disable or interfere with the threshing action carried out by the respective trailing and leading threshing faces 90 and 91, according to the principle of the invention.

A population of threshing bars 210 is emplaced and affixed to cylindrical exterior of threshing drum 60, as generally depicted in FIGS. 31 and 32, to form an exemplary thresher 220 according to the principle of the invention. In FIG. 31, threshing bars are denoted at 210, and are shown set onto cylindrical exterior 61 of threshing drum 60 in preparation for threshing. Threshing bars 210 are positioned with their leading edges 80 and leading threshing faces 91 facing or otherwise directed into the threshing direction of rotation of threshing drum 60 indicated by arrow A so as to direct their end faces 82 toward the upstream location 50A of threshing drum 60, and so as to direct their end faces 83 toward the downstream location 50B of threshing drum 60. The crop material deflecting surfaces of threshing bars 210, end faces 82, face upstream location 50A of threshing drum 60, and are oblique relative to and angled toward both upstream location 50A of threshing drum the threshing direction of rotation of threshing drum 60 as indicated by arrow A. In response to rotation of threshing drum 60 in the threshing direction of rotation denoted by arrow A, threshing bars 210 lead with their leading edges 80 and trail with their trailing ends 81 and crop cuttings applied between cylindrical exterior 61 of threshing drum 60 and thresher concave 51 are threshed by and between the rasp structures and spikes formed in the top threshing sides 84 of threshing bars 210 and thresher concave 51 separating the grains from the chaff to form threshings, namely, the chaff and the separated grains. In the customary operation of the combine harvester, the grains fall through sieves into the collection tank inside the combine harvester.

In FIGS. 31, 32, and 33, as each threshing bar 210 is rotated by threshing drum 60 along the threshing direction of rotation over the crop cuttings received between top threshing side 84 of threshing bar 210 and thresher concave 51, the crop cuttings encounter top threshing side 84 from leading edge 80 to trailing end 81 and impact leading threshing face 91 and impact and encounter the rasp structure consisting of grooves 100 and corresponding vanes 101 applied along leading threshing face 91 and trailing threshing face 90 and spike 195 formed along trailing threshing face 90 imparting a threshing action against the crop cuttings to form threshings. The incline of leading threshing face 91 relative to trailing threshing face 90, and the grooves 100 and corresponding vanes 101 forming the rasp structure along leading threshing face 91 and trailing threshing face 90 cooperate to cause threshing bar 210 to perform an aggressive threshing of the crop cuttings to be threshed. Leading threshing face 91 faces upwardly toward thresher concave 51 and faces into the threshing direction of rotation of threshing drum 60 indicated by arrow A and inclines downwardly from trailing threshing face 90 to cylindrical exterior 61 of threshing drum 60 at an average downward incline of 40 degrees relative to trailing threshing face 90, and in response to rotation of threshing drum 60 in the threshing direction of rotation crop cuttings initially impact leading threshing face 91 at a steep and oblique impaction angle of 50-60 degrees and the defined incline of leading threshing face 91 as previously described thus provides an aggressive initial impaction against the crop cuttings in the threshing of such crop cuttings but not so aggressive so as to cause an initial over-threshing of the crop cuttings. The crop cuttings and threshings are forced along the vanes 101 and into and through the grooves 100 defining the crop material conveyance pathways of the rasp structure of threshing fixture 71 in a rearward direction from leading edge 80 to trailing end 81 and further in an angled direction from end face 83 of fixture 71 to trailing end 81 of fixture 71 and are thrust outwardly therefrom toward upstream location 50A of threshing drum 60 and away from end face 82, in response to movement of threshing bar 210 along the threshing direction of rotation of threshing drum 60 leading with leading edge 80. This thrusting of crop cuttings and threshings along and through the crop material conveyance pathways defined by the rasp structure of threshing fixture 71 toward upstream location 50A of threshing drum 60 slows the conveyance of this material along thresher 50 from upstream location 50A to downstream location 50B thereby prolonging the applied threshing action to the crop cuttings to provide a thorough, repeated, more prolonged, and aggressive threshing of the crop cuttings to be threshed as thresher 50 rotates. And so the rasp structure formed by grooves 100 and corresponding vanes 101 creates contact of the crop cuttings against the concave allowing more crop cuttings to rub together, the rasp structure is aggressive and yet gentle on the crop cuttings to allow the crop cuttings to be managed through and along the crop material conveyance pathways formed by grooves 100 and corresponding vanes 101, and spike 195 serves as an aggressive threshing implement configured to cut and break up crops having inherently tough straw.

The presence of no more than one bolt-receiving bore, bore 120 in this example, through fixture 71 from trailing threshing face 90 to threshing drum emplacement side 85 proximate to the back or rear of fixture 71 and the presence of no more than one bore, bore 130 in this example, through fixture 71 from leading threshing face 91 to threshing drum emplacement side 85 proximate to the front of fixture 71 does not disable or interfere with the threshing action carried out by the respective trailing and leading threshing faces 90 and 91, according to the principle of the invention. The front-to-back, two-point coordination of nut-and-bolt assemblies 140 and 150 firmly and rigidly secure threshing bar 210 in place relative to cylindrical exterior 61 of threshing drum 60 and disables threshing bar 210 from both angularly displacing and rotating out of position relative to cylindrical exterior surface 61 of threshing drum 60 during threshing operations.

E

The invention has been described above with reference to illustrative embodiments. However, those skilled in the art will recognize that changes and modifications may be made to the embodiments without departing from the nature and scope of the invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A combine harvester threshing drum threshing bar, comprising:
  a threshing fixture including a leading edge at a front of the threshing fixture, a trailing end at a rear of the threshing fixture, a first face, a second face, a top threshing side and a bottom threshing drum emplacement side, the top threshing side includes a trailing threshing face, a leading threshing face and a corner, the corner between the leading edge and the trailing end and extends between the first face and the second face, the trailing threshing face extends between the opposed first and second faces and between the trailing end and the corner, and the leading threshing face extends between the opposed first and second faces and between the corner and the leading edge and inclines downwardly relative to the trailing threshing face from the corner and cooperates with the bottom threshing drum emplacement side and the opposed first and second faces of the threshing fixture at the leading edge to form a wedge in the threshing fixture;

a crop-threshing rasp structure formed in the top threshing side, the crop-threshing rasp structure comprising alternating grooves and vanes;

a rear bore through the fixture from the trailing threshing face to the threshing drum emplacement side, the rear bore between the opposed first and second faces and between the trailing end and the corner;

a front bore through the fixture from the leading threshing face to the threshing drum emplacement side, the front bore in front of the rear bore, between the opposed first and second faces and between the corner and the leading edge; and the front bore and the rear bore arranged in a front-to-back direction from the front bore proximate to the front of the threshing fixture to the rear bore proximate to the rear of the fixture, the front bore and the rear bore defining a front connection point and a rear connection point, respectively, for a front bolt and a rear bolt, respectively, for bolting the threshing fixture to a cylindrical exterior of a threshing drum at the front connection point and the rear connection point for disabling the threshing fixture from angularly displacing and rotating relative to the cylindrical exterior of the threshing drum.

2. The combine harvester threshing drum threshing bar according to claim 1, further comprising the alternating grooves and vanes present along at least one of the trailing threshing face and the leading threshing face.

3. A combine harvester thresher, comprising:
a combine harvester threshing drum mounted for rotation in a threshing direction relative to a combine harvester concave, the threshing drum having a cylindrical exterior;

a population of threshing drum threshing bars secured to the cylindrical exterior of the threshing drum for threshing a crop applied between the cylindrical exterior of the threshing drum and the concave in response to rotation of the threshing drum in the threshing direction;

each of the threshing drum threshing bars comprising:
a threshing fixture including a leading edge at a front of the threshing fixture, the leading edge directed into the threshing direction, a trailing end at a rear of the threshing fixture, the trailing end directed away from the threshing direction, a first face, a second face, a top threshing side configured to thresh a crop applied between the cylindrical exterior of the threshing drum and the concave in response to rotation of the threshing drum in the threshing direction, and a bottom threshing drum emplacement side in juxtaposition with the cylindrical exterior of the threshing drum, the top threshing side includes a trailing threshing face, a leading threshing face and a corner, the corner between the leading edge and the trailing end and extends between the first face and the second face, the trailing threshing face extends between the opposed first and second faces and between the trailing end and the corner, and the leading threshing face extends between the opposed first and second faces and between the corner and the leading edge and inclines downwardly relative to the trailing threshing face from the corner and cooperates with the bottom threshing drum emplacement side and the opposed first and second faces of the threshing fixture at the leading edge to form a wedge in the threshing fixture;

a crop-threshing rasp structure formed in the top threshing side, the crop-threshing rasp structure comprising alternating grooves and vanes;

a rear bore through the fixture from the trailing threshing face to the threshing drum emplacement side, the rear bore between the opposed first and second faces and between the trailing end and the corner;

a front bore through the fixture from the leading threshing face to the threshing drum emplacement side, the front bore in front of the rear bore, between the opposed first and second faces and between the corner and the leading edge;

the front bore and the rear bore arranged in a front-to-back direction from the front bore proximate to the front of the threshing fixture to the rear bore proximate to the rear of the fixture, the front bore defining a front connection point for a front bolt including a first head and a first connecting end, and the rear bore defining a rear connection point for a rear bolt including second head and a second connecting end;

the fixture secured to the threshing drum at the front connection point by the front bolt and at the rear connection point by the rear bolt, disabling the threshing fixture from angularly displacing and rotating relative to the cylindrical exterior of the threshing drum;

the front bolt extending through the front bore from the first head seated in the front bore to the first connecting end secured to the threshing drum; and the rear bolt extending through the rear bore from the second head seated in the rear bore to the second connecting end secured to the threshing drum.

4. The combine harvester threshing drum threshing bar according to claim 3, further comprising the alternating grooves and vanes present along at least one of the trailing threshing face and the leading threshing face.

* * * * *